US011651191B2

(12) United States Patent
Gill et al.

(10) Patent No.: US 11,651,191 B2
(45) Date of Patent: May 16, 2023

(54) METHODS, APPARATUSES, AND COMPUTER PROGRAM PRODUCTS USING A REPEATED CONVOLUTION-BASED ATTENTION MODULE FOR IMPROVED NEURAL NETWORK IMPLEMENTATIONS

(71) Applicant: HERE Global B.V., Eindhoven (NL)

(72) Inventors: Amritpal Singh Gill, Eindhoven (NL); Nicholas Dronen, Berlin (DE); Shubhabrata Roy, Geldrop (NL); Raghavendran Balu, Eindhoven (NL)

(73) Assignee: Here Global B.V., Eindhoven (NL)

( * ) Notice: Subject to any disclaimer, the term of this patent is extended or adjusted under 35 U.S.C. 154(b) by 872 days.

(21) Appl. No.: 16/559,032

(22) Filed: Sep. 3, 2019

(65) Prior Publication Data

US 2021/0064955 A1  Mar. 4, 2021

(51) Int. Cl.
*G06N 3/00* (2006.01)
*G06N 3/04* (2023.01)
(Continued)

(52) U.S. Cl.
CPC .............. *G06N 3/04* (2013.01); *G06N 3/08* (2013.01); *G06V 10/82* (2022.01)

(58) Field of Classification Search
CPC .......... G06N 3/04; G06N 3/08; G06N 3/084; G06N 3/0454; G06V 10/82
See application file for complete search history.

(56) References Cited

U.S. PATENT DOCUMENTS

2019/0279035 A1* 9/2019 Bluche .............. G06V 30/18057
2019/0294970 A1* 9/2019 Fidler .................. G06V 10/774

FOREIGN PATENT DOCUMENTS

CN       108734290 A    11/2018
WO   WO 2018/170401 A1    9/2018

OTHER PUBLICATIONS

Medina etal, Parallel Attention Mechanisms in Neural Machine Translation, 17th IEEE International Conference on Machine Learning and Applications (ICMLA), pp. 547-552,Dec. 17-20, 2018.*

(Continued)

*Primary Examiner* — Nancy Bitar
*Assistant Examiner* — Xiao Liu
(74) *Attorney, Agent, or Firm* — Alston & Bird LLP

(57) ABSTRACT

A method, apparatus, and computer program product are provided for providing improved neural network implementations using a repeated convolution-based attention module. Example embodiments implement a repeated convolution-based attention module that utilizes multiple iterations of a repeated convolutional application layer and subsequent augmentations to generate an attention module output. Example methods may include augmenting an attention input data object based on a previous iteration convolutional output to produce a current iteration input parameter, inputting the input parameter to a repeated convolutional application layer to generate a current iteration input parameter, repeating for multiple iterations, and augmenting the attention input data object based on the final convolutional output to produce an attention module output. Other methods may include an initial convolutional application layer, and/or apply and augment the output of the initial convolutional application layer, and include convolutional application layer(s) having at least two sub-layers.

20 Claims, 10 Drawing Sheets

(51) Int. Cl.
   *G06N 3/08*      (2023.01)
   *G06V 10/82*     (2022.01)

(56) References Cited

OTHER PUBLICATIONS

Abdulnabi, A. H. et al., *Episodic CAMN: Contextual Attention-based Memory Networks With Iterative Feedback for Scene Labeling* [online] [retrieved Nov. 6, 2019], Retrieved from the Internet: http://vintage.winklerbros.net/Publications/cvpr2017.pdf (dated 2017) 10 pages.
Bello, I. et al., *Attention Augmented Convolutional Networks* [online] [retrieved Nov. 6, 2019]. Retrieved from the Internet: https://www.groundai.com/project/attetition-augmented-convolutional-networks/1 (dated Apr. 22, 2019) 19 pages.
He, K. et al., *Deep Residual Learning for Image Recognition*, arXiv:1512.03385v1 (Dec. 10, 2015) 12 pages.
Howard, A. G. et al., *MobileNets: Efficient Convolutional Neural Networks for Mobile Vision Appications*, arXiv:1704.04861v1 (Apr. 17, 2017) 9 pages.
Mnih, V. et al., *Recurrent Models of Visual Attention* [online] [retrieved Nov. 6, 2019]. Retrieved from the Internet: https://papers.nips.cc/paper/5542-recurrent-models-of-visual-attention.pdf (dated 2014) 9 pages.
Schlemper, J. et al., *Attention Gated networks: Learning to Leverage Salient Regions in Medical Images*, arXiv:1808.08114v2 (dated Jan. 20, 2019) 25 pages.
Wang, F. et al., *Residual Attention Network for Image Classification*, arXiv:1704.06904v1 (Apr. 23, 2017) 9 pages.

\* cited by examiner

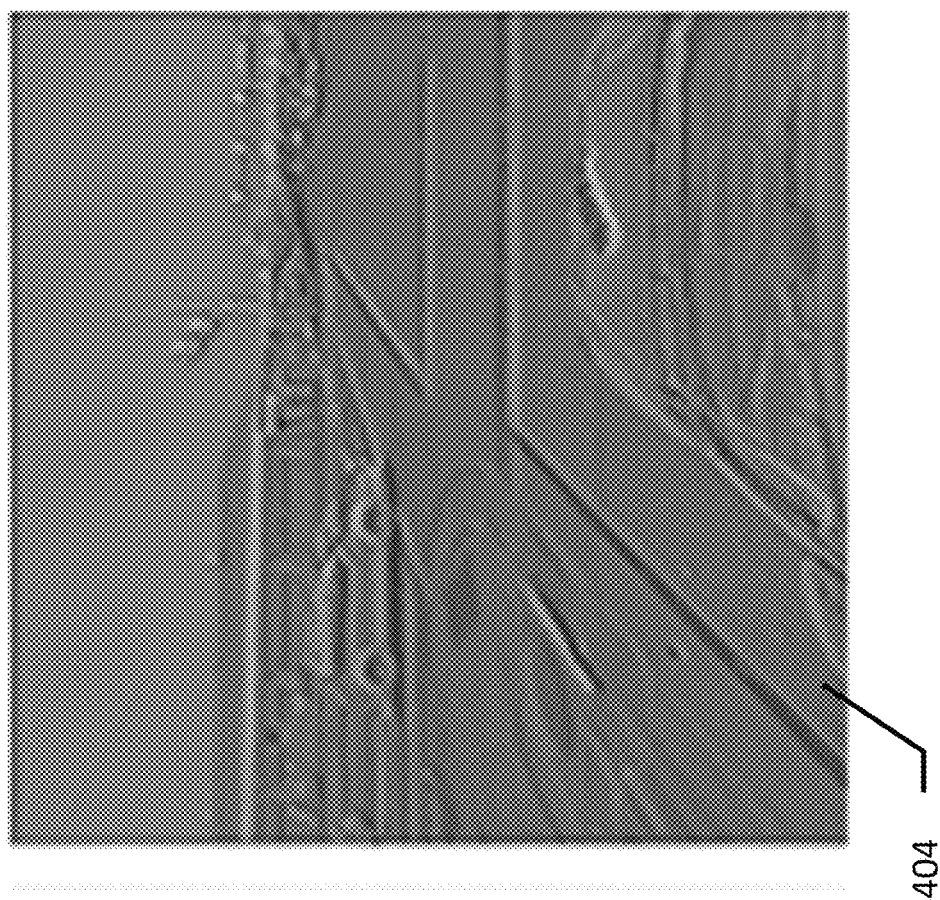
FIG. 4

METHODS, APPARATUSES, AND COMPUTER PROGRAM PRODUCTS USING A REPEATED CONVOLUTION-BASED ATTENTION MODULE FOR IMPROVED NEURAL NETWORK IMPLEMENTATIONS

TECHNOLOGICAL FIELD

Embodiments of the present disclosure relate, generally, to image classification, and more specifically, to image classification capable of being performed in a resource constrained environment using a repeated convolution-based attention module.

BACKGROUND

Deep learning-based implementations, for example convolutional neural networks, may be used for various tasks, including classification, processing, detection, analysis, and transformation. Such convolutional neural networks may, over one or more layers, learn patterns within input data to produce corresponding output data. Such conventional implementations lack effective means to identify portions of the input data to which the attention of the analysis should be focused, and thus such implementations are often inefficient and/or inaccurate. In some contexts, convolutional neural network implementations may be constrained by the particular computing resources of an edge device, causing waste of scarce computing resources available via the edge device, and thereby increasing the likelihood of system bottlenecking or hang-up.

BRIEF SUMMARY

In general, embodiments of the present disclosure provided herein include systems, methods, apparatuses, and computer readable media for improved image classification using a repeated convolution-based attention module. Other systems, apparatuses, methods, computer readable media, features thereof, implementations, and the like, will become apparent to one with skill in the art upon examination of the following figures and detailed description. It is intended that all such additional systems, apparatuses, methods, computer readable media, features thereof, implementations, and the like, included within this description be within the scope of the disclosure and be protected by the following claims.

A method, apparatus, and computer program product are therefore provided for providing improved neural network implementations using a repeated convolution-based attention module. Embodiments may utilize a repeated convolution-based attention module that improves the accuracy of neural networking tasks without significantly increasing the number of parameters associated with maintaining the neural network, improving overall processing efficiency and enabling use within resource constrained environments.

According to an example embodiment, an apparatus is provided including at least one processor and at least one memory including computer-coded instructions. The computer-coded instructions are configured to, when executed by the at least one processor, cause the apparatus to at least: receive an attention input data object; augment the attention input data object based on a previous iteration convolutional output to produce an input parameter; apply the input parameter to a repeated convolutional application layer to produce a current iteration convolutional output; repeat at least one iteration to augment the attention input data object based on the previous iteration convolutional output to produce the input parameter and apply the input parameter to the repeated convolutional application layer to produce the current iteration convolutional output; determine to cease repeating iterations; augment the attention input data object based on a final convolutional output to produce an attention module output; and output the attention module output.

According to some embodiments, causing the apparatus to determine to cease repeating iterations is based on an attention repetition threshold. Additionally or alternatively, according to some embodiments, causing the apparatus to augment the attention input data object based on each convolutional output using a concatenation transformation. According to some embodiments, the attention input data object comprises one or more of (1) image data, and (2) feature map data. According to some embodiments, the attention module output comprises multidimensional feature map data.

Additionally or alternatively, according to some embodiments, the apparatus is further caused to apply the attention module output to a remaining neural network processing layer to produce a convolutional network output based on the attention module output; and output the convolutional network output. Alternatively or additionally, according to some embodiments, the apparatus further comprises an image capture device configured to capture the attention input data object.

Embodiments provided herein may include methods, where an example method may include: receiving an attention input data object; augmenting the attention input data object based on a previous iteration convolutional output to produce an input parameter; applying the input parameter to a repeated convolutional application layer to produce a current iteration convolutional output; repeating at least one iteration to augment the attention input data object based on the previous iteration convolutional output to produce the input parameter and apply the input parameter to the repeated convolutional application layer to produce the current iteration convolutional output; determining to cease repeating iterations; augmenting the attention input data object based on a final convolutional output to produce an attention module output; and outputting the attention module output.

According to some embodiments, determining to cease repeating iterations may be based on an attention repetition threshold. Additionally or alternatively, in some embodiments, augmenting the attention input data object comprises augmenting the attention input data object using a concatenation transformation. Additionally or alternatively, in some embodiments, receiving the attention input data object may include receiving the attention input data object from an image capture device. Additionally or alternatively, methods may include applying the attention module output to a remaining neural network processing layer to produce a convolutional network output based on the attention module output; and outputting the convolutional network output.

Embodiments provided herein may include a computer program product having at least one non-transitory computer-readable storage medium having computer-executable program code instructions stored therein, the computer-executable program code instructions including program code instructions to: receive an attention input data object; augment the attention input data object based on a previous iteration convolutional output to produce an input parameter; apply the input parameter to a repeated convolutional application layer to produce a current iteration convolutional output; repeat at least one iteration to augment the attention input data object based on the previous iteration convolutional output to produce the input parameter and apply the input parameter to the repeated convolutional application layer to produce the current iteration convolutional output; determine to cease repeating iterations; augment the attention input data object based on a final convolutional output to produce an attention module output; and output the attention module output.

Embodiments provided herein may include a computer program product having at least one non-transitory computer-readable storage medium having computer-executable program code instructions stored therein, the computer-executable program code instructions including program code instructions to: receive an attention input data object; apply the attention input data object to an initial convolutional application layer to produce an initial convolutional output, where an input parameter is set to the initial convolutional output; apply the input parameter to a repeated convolutional application layer to produce an additional convolutional output; augment the initial convolutional output, based on the additional convolutional output, to produce an augmented convolutional output, where the input parameter is updated to the augmented convolutional output; repeat at least one iteration to apply the updated input parameter to the repeated convolutional application layer to produce the additional convolutional output for each iteration, and augment the initial convolutional output based on the additional convolutional output for each iteration to produce the augmented convolutional output for each iteration; determine to cease repeating iterations; augment the attention input data object based on a final augmented convolutional output to produce an attention module output; and output the attention module output.

The program code instructions of some example embodiments to augment the initial convolutional output may comprise program code instructions to augment the initial convolutional output based on the additional convolutional output using an addition transformation to produce the augmented convolutional output. Additionally or alternatively, the program code instructions to augment the attention input data object based on the final augmented convolutional output may include program code instructions to augment the attention input data object based on the final augmented convolutional output using a concatenation transformation to produce the attention module output. Additionally or alternatively, in some embodiments, program code instructions to receive the attention input data object comprises computer program instructions to capture the attention input data object using an image capture device. Additionally or alternatively, in some embodiments, the repeated convolutional application layer may include at least two sub-layers.

Additionally or alternatively, some embodiments further include program code instructions to: apply the attention module output to a remaining neural network processing layer to produce a convolutional network output based on the attention module output; and output the convolutional network output.

Additionally or alternatively, some embodiments further include computer program instructions to, in parallel with the repeated iterations of the repeated application layer and corresponding augmentation: apply a second input parameter to a second repeated convolutional application layer to produce a second additional convolutional output, wherein the second input parameter for the first iteration is set to the initial convolutional output; augment the initial convolutional output, based on the second additional convolutional output, to produce a second augmented convolutional output, where the second input parameter is updated to the second augmented convolutional output; and repeat at least one iteration to apply the updated second input parameter to the second repeated convolutional application layer to produce the second additional convolutional output for each iteration, and augment the second initial convolutional output based on the second additional convolutional output for each iteration to produce the second augmented convolutional output for each iteration, wherein to produce the attention module output, the apparatus is configured to augment the attention input data object based on a first final augmented convolutional output and a second final augmented convolutional output. In some embodiments, the program code instructions to augment the attention input data object based on the first final augmented convolutional output and the second final augmented convolutional output may include program code instructions to: augment the first final augmented convolutional output based on the second final augmented convolutional output, using an addition transformation, to produce a combined convolutional output: and augment the attention input data object based on the combined convolutional output using a concatenation transformation to produce the attention module output.

Embodiments provided herein further include an apparatus having at least one processor and at least one memory having computer-coded instructions therein, the computer-coded instructions configured to: receive an attention input data object; apply the attention input data object to an initial convolutional application layer to produce an initial convolutional output, where an input parameter is set to the initial convolutional output; apply the input parameter to a repeated convolutional application layer to produce an additional convolutional output; augment the initial convolutional output, based on the additional convolutional output, to produce an augmented convolutional output, where the input parameter is updated to the augmented convolutional output; repeat at least one iteration to apply the updated input parameter to the repeated convolutional application layer to produce the additional convolutional output for each iteration, and augment the initial convolutional output based on the additional convolutional output for each iteration to produce the augmented convolutional output for each iteration; determine to cease repeating iterations; augment the attention input data object based on a final augmented convolutional output to produce an attention module output; and output the attention module output.

Embodiments provided herein may include a method, wherein a method may include: receiving an attention input data object; applying the attention input data object to an initial convolutional application layer to produce an initial convolutional output, where an input parameter is set to the initial convolutional output; applying the input parameter to a repeated convolutional application layer to produce an additional convolutional output; augmenting the initial convolutional output, based on the additional convolutional output, to produce an augmented convolutional output, where the input parameter is updated to the augmented convolutional output; repeating at least one iteration to apply the updated input parameter to the repeated convolutional application layer to produce the additional convolutional output for each iteration, and augment the initial convolutional output based on the additional convolutional output for each iteration to produce the augmented convolutional output for each iteration; determining to cease repeating iterations; augmenting the attention input data object based on a final augmented convolutional output to produce an attention module output; and outputting the attention module output.

BRIEF DESCRIPTION OF THE DRAWINGS

Figure 1:
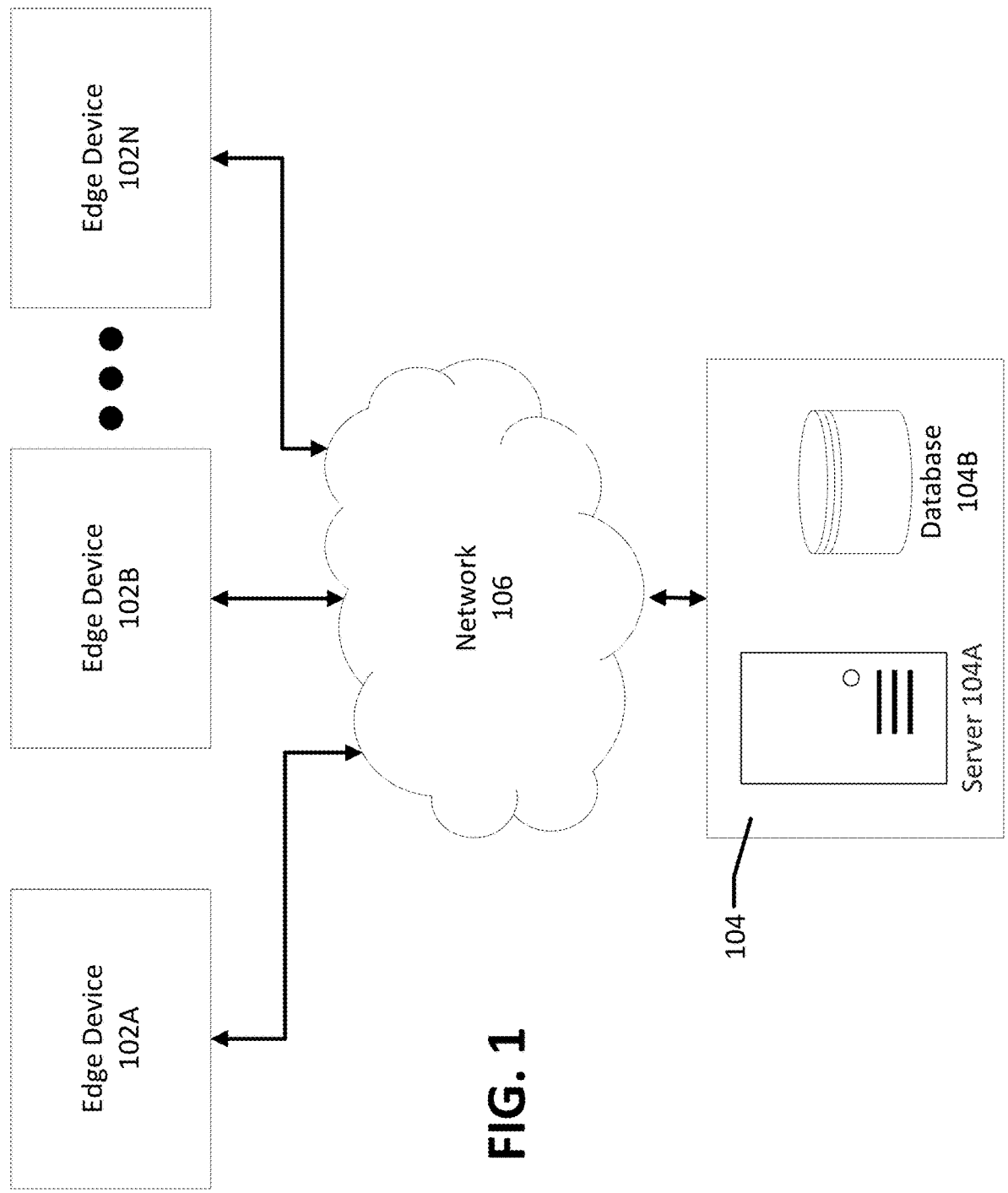
Figure 2:
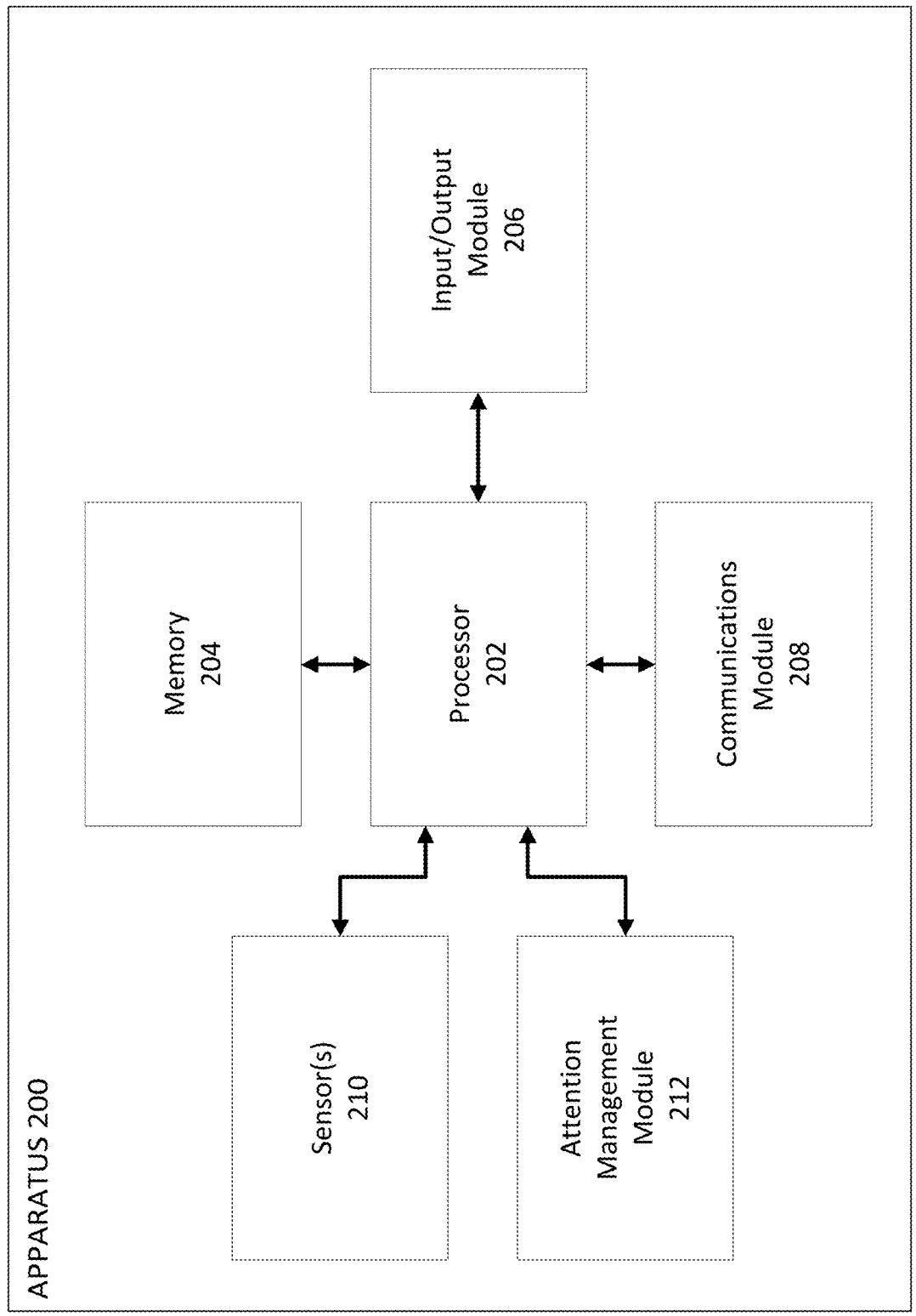
Figure 3:
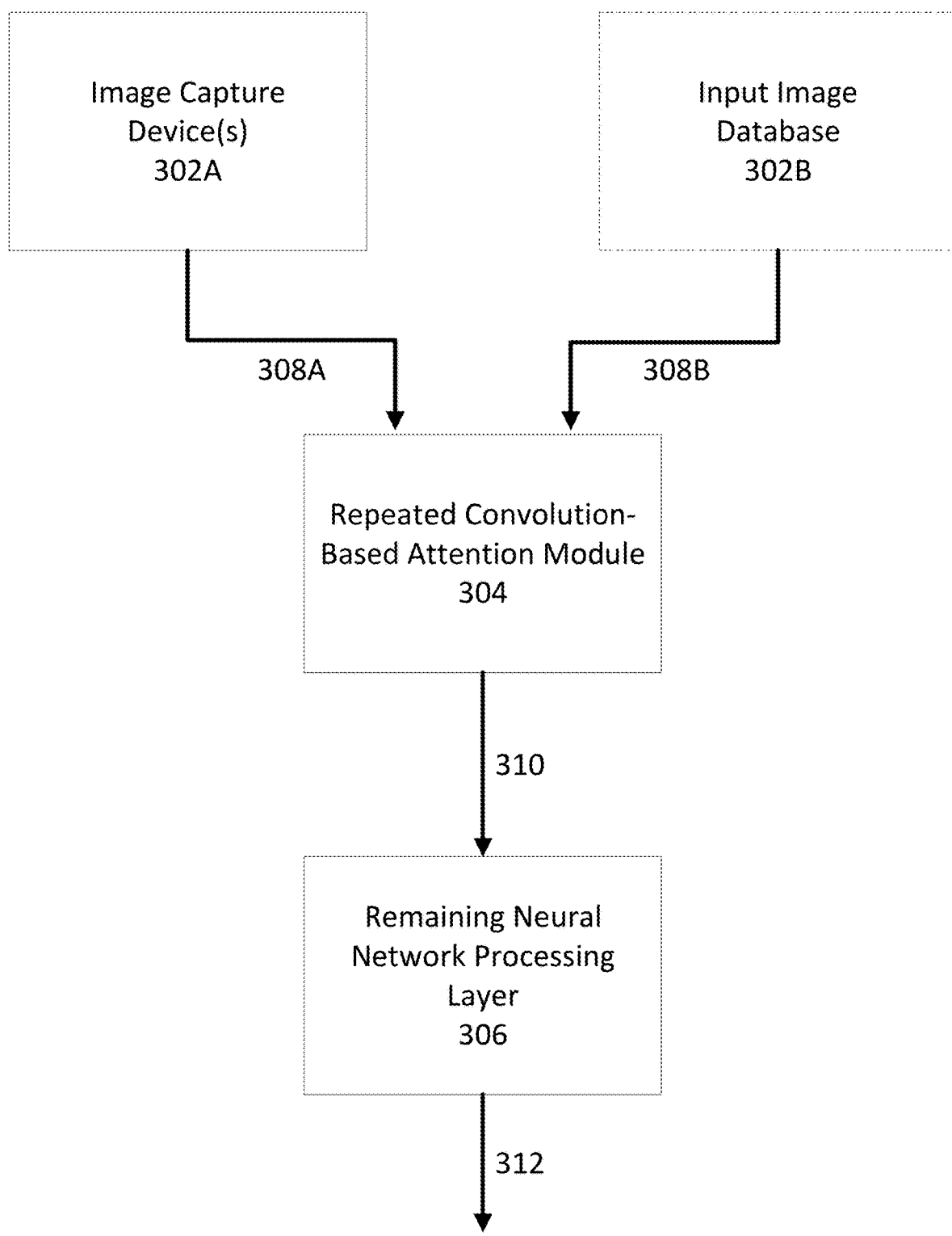
Figure 5:
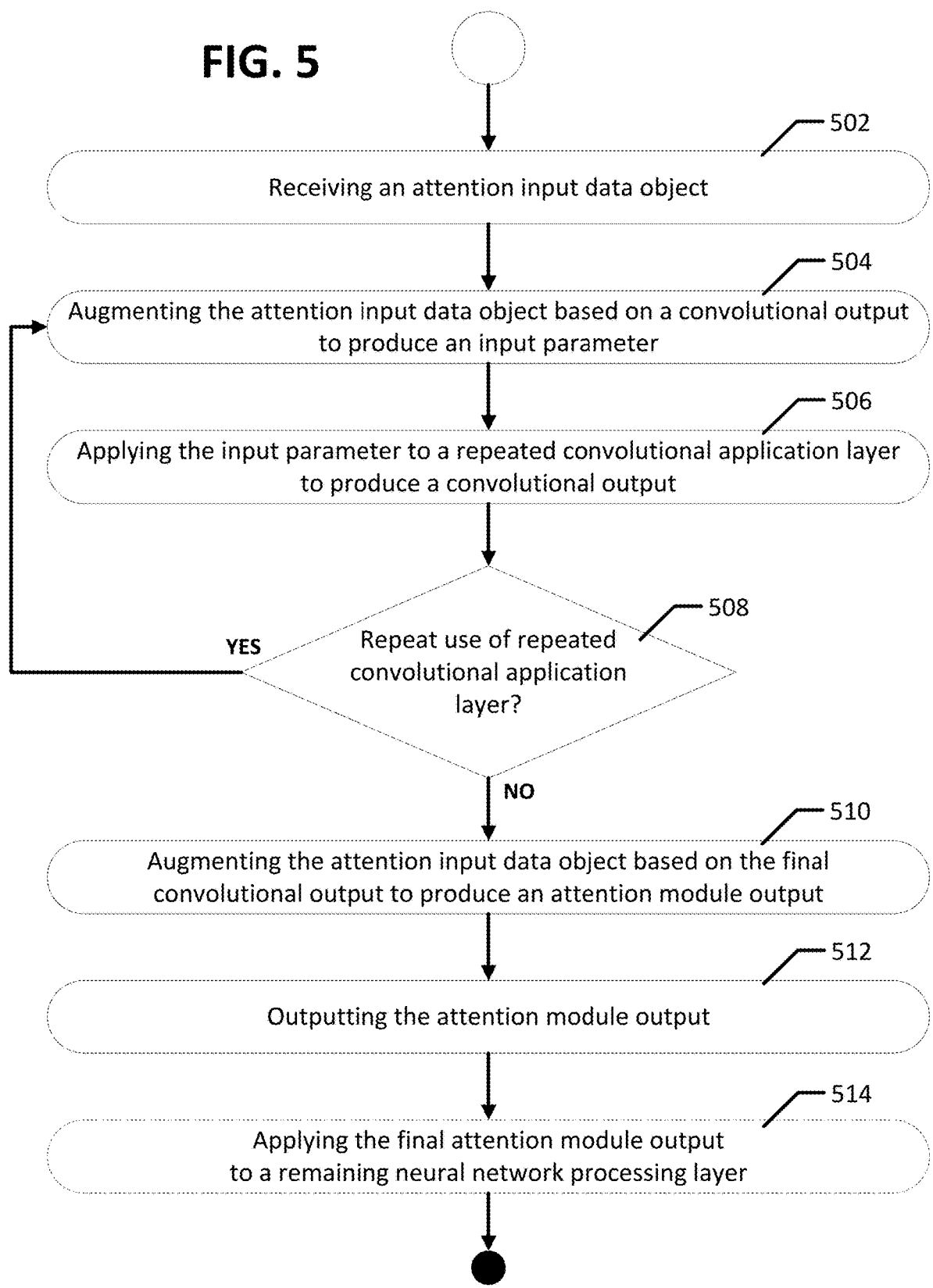
Figure 6:
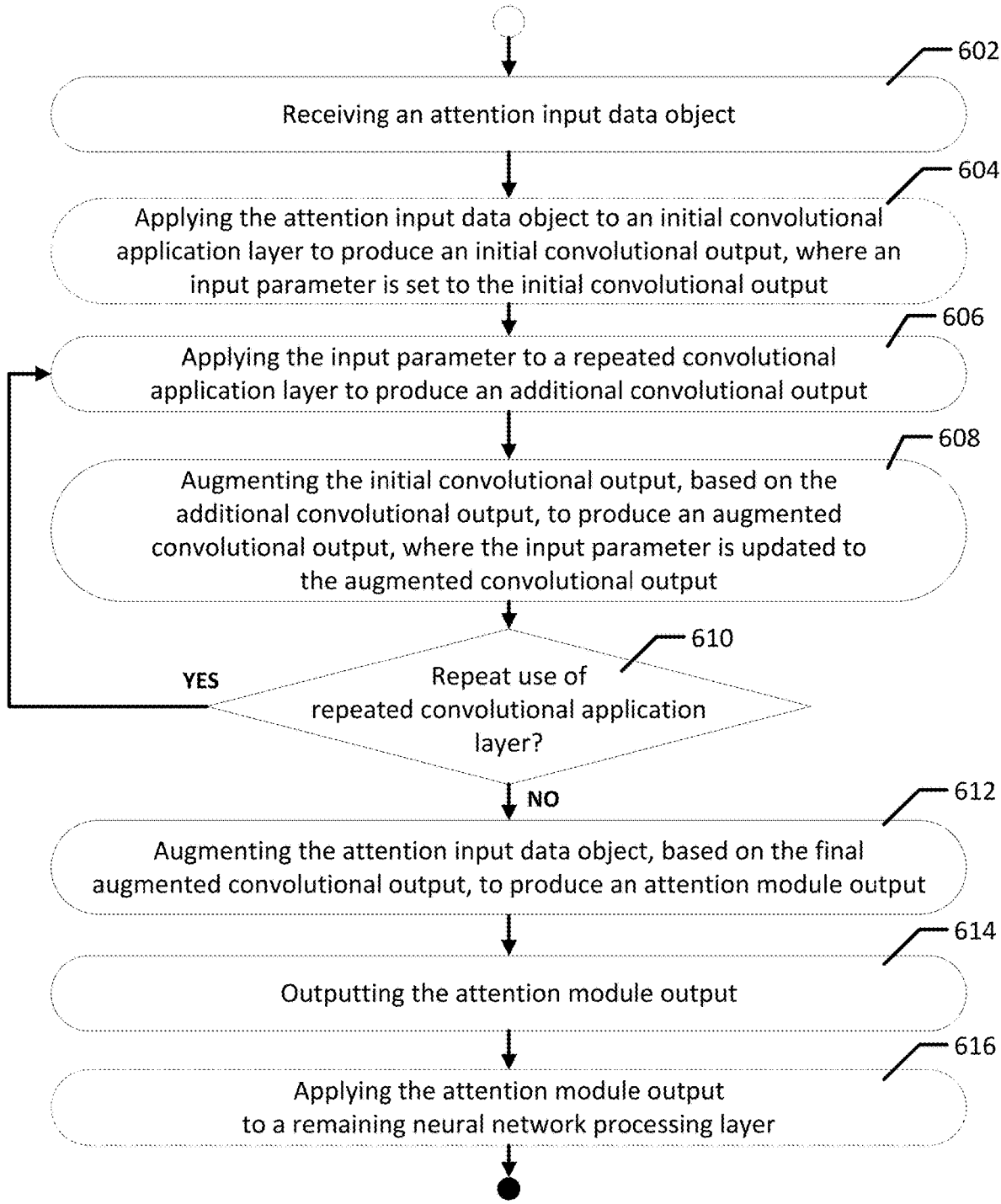
Figure 7:
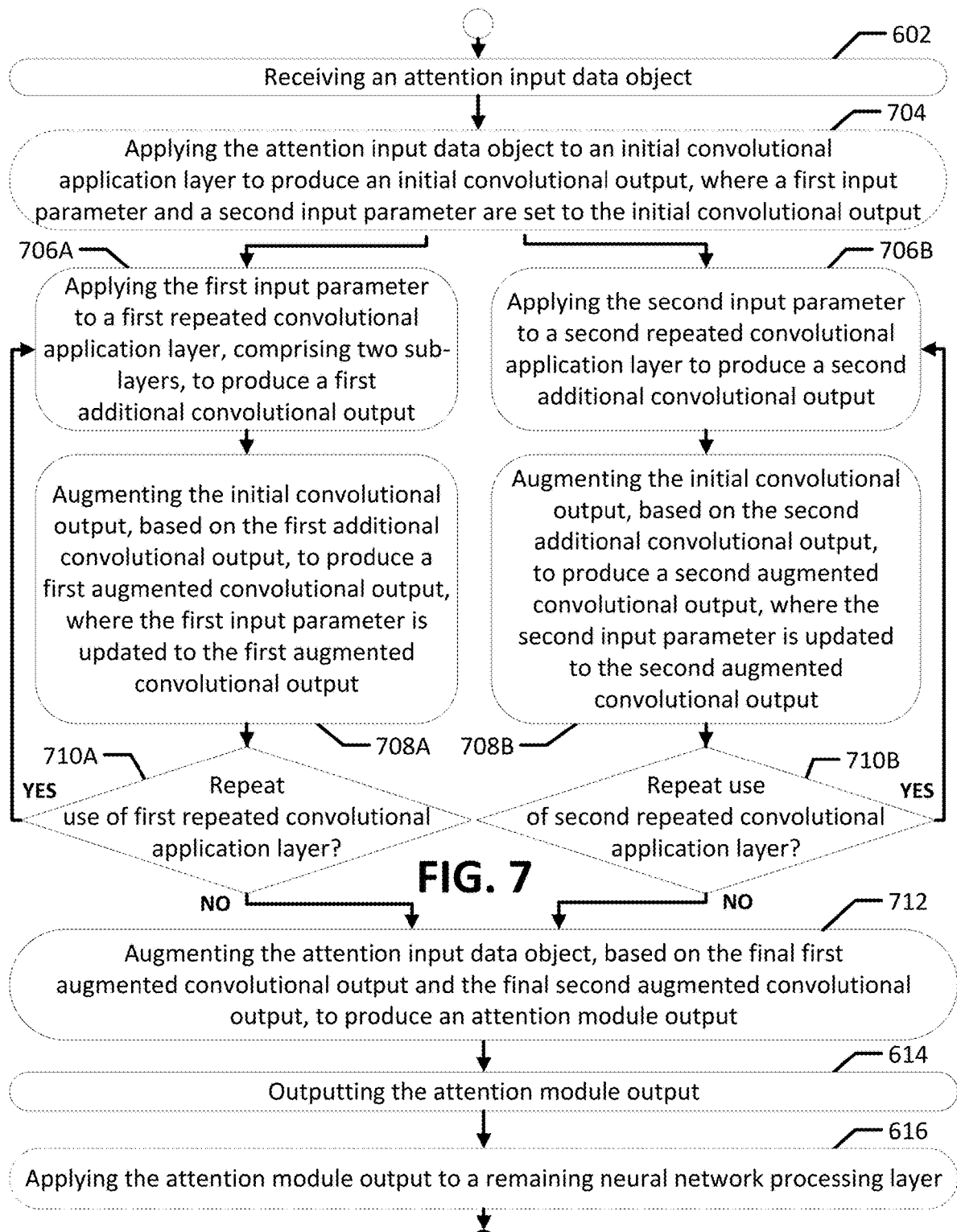
Figure 8:
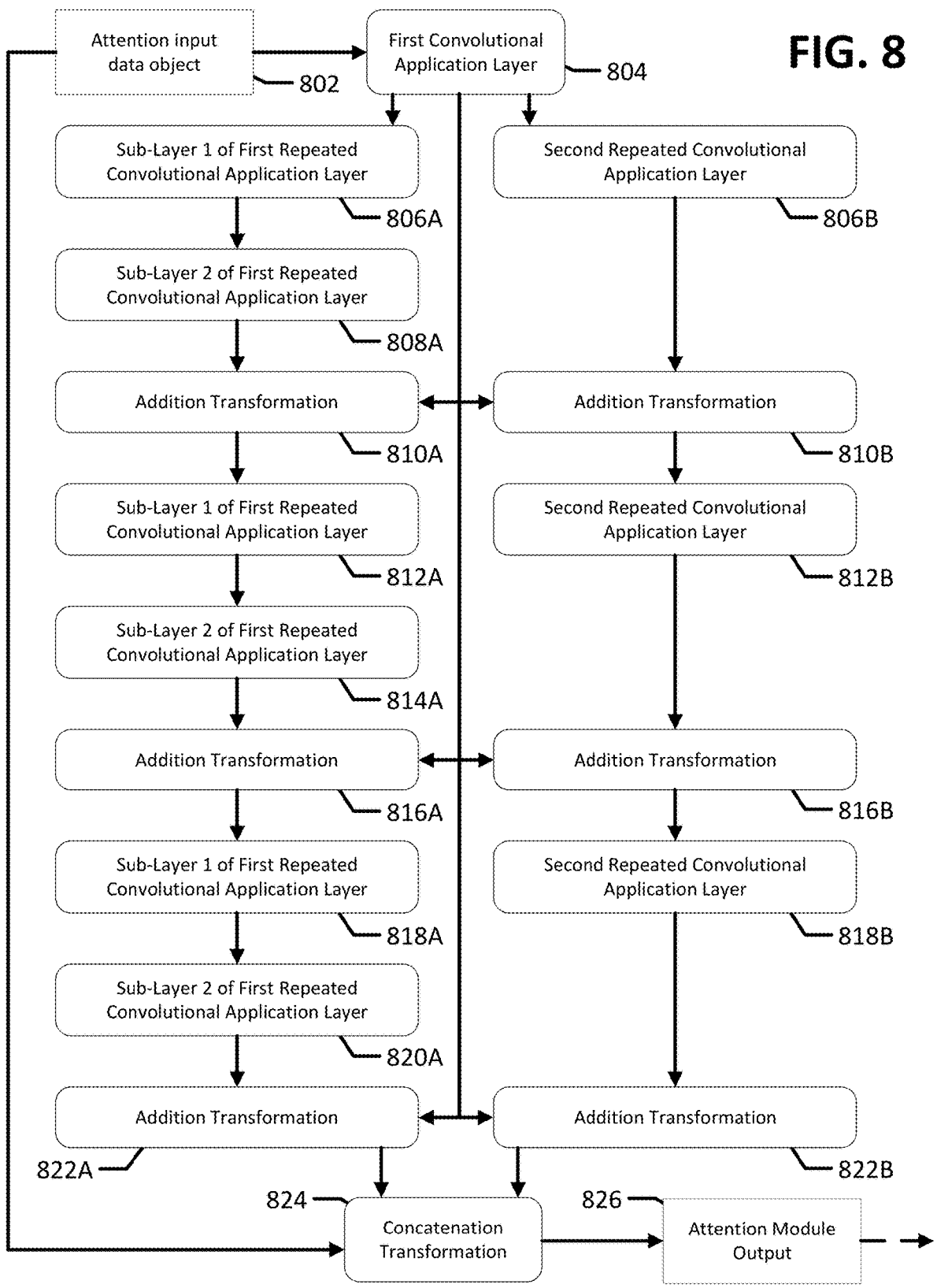
Figure 9:
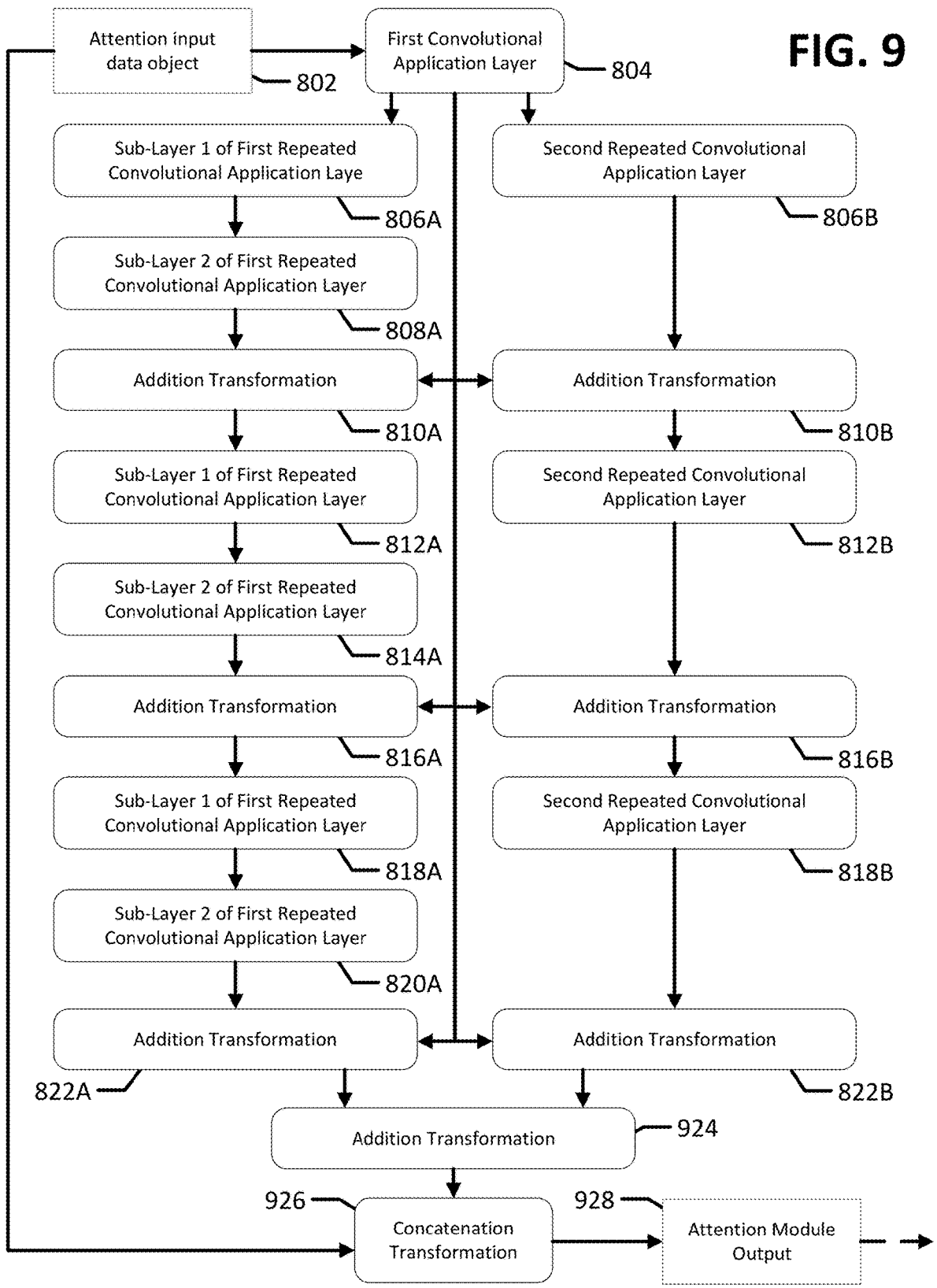
Figure 10:
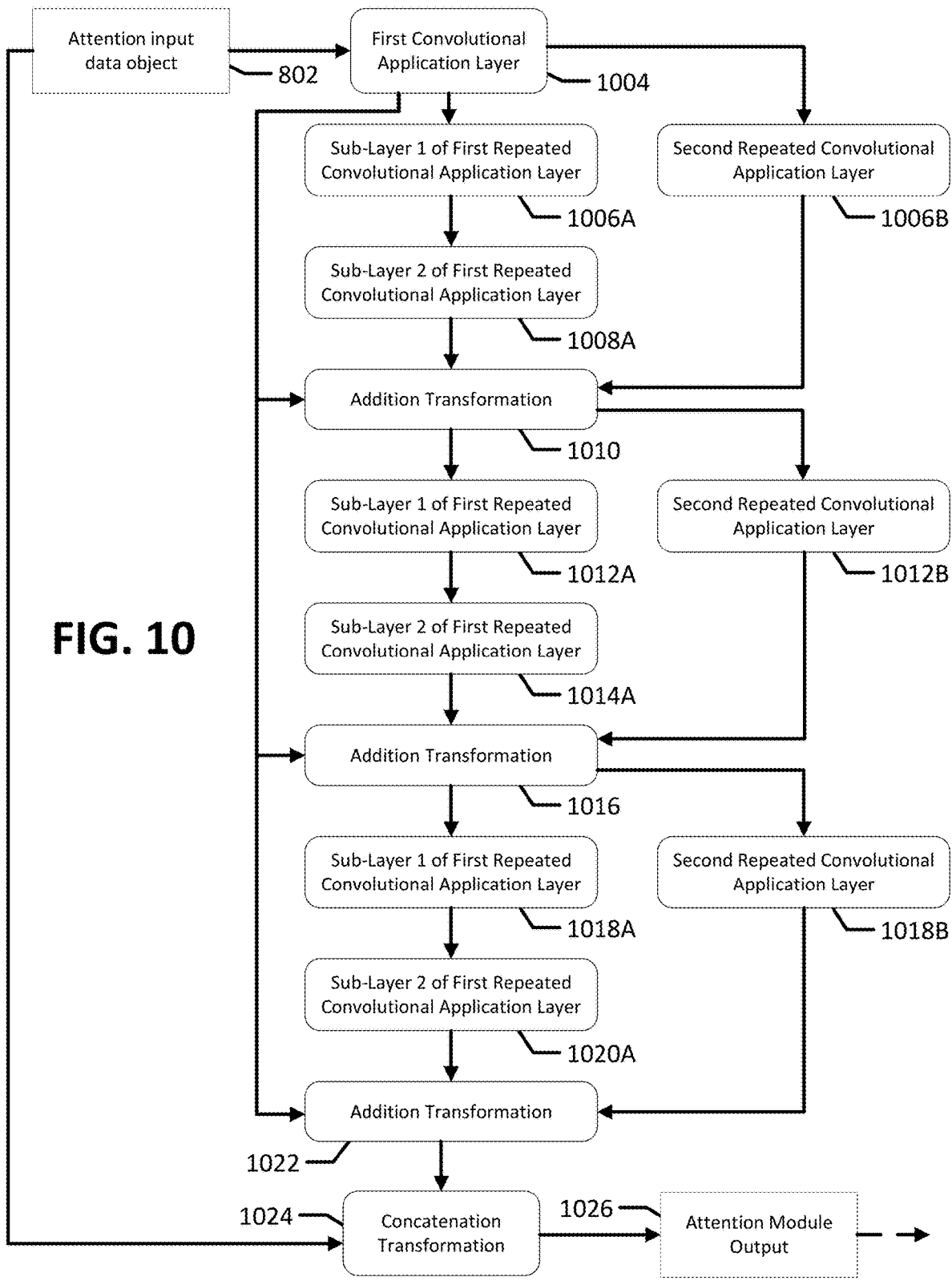

Having thus described embodiments of the disclosure in general terms, reference will be made to the accompanying drawings, which are not necessarily drawn to scale, and wherein:

FIG. 1 illustrates a block diagram of a specially configured system within which embodiments of the present disclosure may operate;

FIG. 2 illustrates a block diagram of an example apparatus that may be specially configured in accordance with an example embodiment of the present disclosure;

FIG. 3 illustrates an example component diagram of a specially configured system in accordance with an example embodiment of the present disclosure;

FIG. 4 illustrates example repeated attention module input and output image representations in accordance with an example embodiment of the present disclosure;

FIG. 5 illustrates a flowchart depicting various operations performed in an example process for generating attention data using a repeated convolution-based attention module, in accordance with an example embodiment of the present disclosure;

FIG. 6 illustrates a flowchart depicting various operations performed in an example process for generating attention data using a repeated convolution-based attention module, in accordance with an example embodiment of the present disclosure;

FIG. 7 illustrates a flowchart depicting various operations performed in an example process for generating attention data using a repeated convolution-based attention module specifically a parallel repeated convolution-based attention module, in accordance with an example embodiment of the present disclosure; and FIG. 8-10 illustrate data flow diagrams between blocks of parallel repeated convolution-based attention modules configured for generating attention data, in accordance with example embodiments of the present disclosure.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, and/or stored in accordance with embodiments of the present disclosure. Thus, user of any such terms should not be taken to limit the spirit and scope of embodiments of the present disclosure.

As defined herein, a "computer-readable storage medium," which refers to a non-transitory physical storage medium (for example, volatile or non-volatile memory device), can be differentiated from a "computer-readable transmission medium," which refers to an electromagnetic signal.

Overview

Artificial intelligence and machine learning tasks are particularly important in achieving efficient, robust, and effective solutions to many complex analysis tasks. For example, robust and effective computer vision is particularly important in the field of artificial intelligence. Computer vision often utilizes sophisticated methods for prediction and analysis to achieve sufficient results for use in automating a particular task. Deep learning-based methods of computer vision, for example convolutional neural networks (CNNs), may be particularly effective in producing robust and accurate computer vision systems.

Conventional deep learning-based implementations for computer vision (and other analysis tasks such as segmentation, data transformation, and the like), such as conventional CNN implementations, utilize significant computing resources to achieve efficient and/or accurate results. For example, the number of parameters for a particular CNN may be in the order of millions, requiring significant processing resources and/or memory resources, or other computing resources, to implement the CNN based on this significant number of parameters.

A CNN may be employed and/or otherwise configured, trained, and/or the like for various pixel-level tasks. For example, a CNN may be trained for semantic segmentation, objection detection and classification and depth estimation. Such implementations utilize additional computing resources to add attention to region(s) of pixels that are of interest to the particular task. Such CNNs may be executed by edge devices, which may utilize limited computing resources (e.g., limited processing resources, memory resources, battery resources, network resources, and/or the like). The edge device may be particularly constrained by particular computing resources (e.g., bottlenecked by network resources and/or latency, processing resources, or the like).

In some systems, an edge device may capture image data for processing and/or transmission to a central processing server for various actions. Due to constraints associated with computing resources of the edge device, the edge device may be configured to limit computing resources required to accomplish a particular task or transmission. For example, an edge device may be configured to perform one or more pixel-level classification tasks using attention data. By adding attention data to a region of a captured image that is particularly of interest, the edge device reduces computer bottleneck and latency. Limiting computing resources utilized to complete a particular action advantageously enables improved performance on edge devices that are constrained by such computational resources.

For example, in the particular context of autonomous and semi-autonomous vehicles, the vehicle may be equipped with various resource-constrained (e.g., limited computing resources) circuitry, modules, and/or the like for capturing and processing image data, for example via a CNN, for use in one or more tasks. In particular examples, captured image data may be analyzed and otherwise processed for object detection, or otherwise to identify features in the captured image data that are useful in particular decision-making, navigation, perception, or other actions. Captured image data may be analyzed, via a CNN for example, to classify and label particular features determined to be present in the image data (e.g., lane markers, sign posts, traffic signals, pedestrians, other vehicles, and the like). An attention module may be applied to improve the performance of the CNN, for example to increase the accuracy of the produced categories or other output. Specifically, attention modules may be applied to a CNN to improve the performance and efficiency of CNN training and prediction, such as where the attention module produces output that focuses the CNN on one or more particular regions of the input image. As the configuration of the attention module is simplified, the overall efficiency of the CNN is improved by limiting computational resources required to account for the resource constrained nature of such edge devices.

Embodiments of the present disclosure utilize a repeated convolution-based attention module to improve performance of a convolutional neural network configured to perform a particular task, for example image classification, and other pixel-level tasks. The repeated convolution-based attention module outputs data that draws attention to particular portions of the input data, based on learned patterns, and may be integrated into a deep learning neural network (e.g., a CNN) to improve the overall efficiency and accuracy of the network. The repeated convolution-based attention module may maintain the properties and nature of the input received by the repeated convolution-based attention module, such that the repeated convolution-based attention module may be integrated into any location within a convolutional neural network. The repeated convolution-based attention module, in some embodiments, improves the accuracy of the convolutional neural network within which the repeated convolution-based attention module is integrated, while minimizing the computing resources required to implement the repeated convolution-based attention module. Particularly, in resource-constrained environments, the repeated convolution-based attention module may leverage implementation of a CNN (having one or more convolutional layers) to decrease the required number of parameters for performing a particular task, such as by leveraging the stacking of layers and convolving small filter banks across an entire image. Additionally, to further save computing resources in example contexts, repeated convolutional application layers of a repeated convolution-based attention module share parameters. In this regard, use of the repeated convolution-based attention module reduces memory resources utilized by the system over conventional attention implementations, which enables other systems and/or subsystems to function or otherwise utilize the saved memory resources. In one example content of a resource constrained environment, the saved memory resources enable a plurality of systems to function without additional hardware components and/or advanced hardware components, reducing overall system space and enabling the use of less complex and less expensive components.

The repeated convolution-based attention module of an example embodiment weighs individual pixels, or groups of pixels, based on how important the pixel(s) is/are to the given task. The repeated convolution-based attention module may, for example produce an attention module output that includes weights associated with each pixel of a captured image. The weights may reflect the importance of the pixel towards specific aspects or features of the image (e.g., edge, texture, object, or the like) that the module determines to be important for the associated task. The specific aspects may be highlighted for each layer from the first layer to the final layer. For example, the weights may reflect pixel-level features for the first layer and high-level features at higher layers.

The repeated convolution-based attention module, in some embodiments, weighs pixels (e.g., individual pixels or grouped pixels) at various layers that form the module. In this regard, the weights of the pixels at a particular layer (e.g., an initial convolutional application layer or first iteration of a repeated convolutional application layer) causes successive layers to attend to regions of the attention input data object (e.g., an image or pre-processed image, such as a feature map) that were highly-weighted by the previous layer. As more iterations of a repeated convolutional application layer occur in the repeated convolution-based attention module, the produced output may include weights that represent associations with higher-level aspects and/or features (for example, edges, textures, or the like).

A repeated convolution-based attention module may be designed as a relatively small unit configured to utilize at least one repeated convolutional application layer a repeated number of times. For example, a repeated convolution-based attention module may be specially configured to include only a particular repeated convolutional application layer that may be utilized for some number of iterations (e.g., 4 iterations, 6 iterations, or the like), which may be automatically determined or set by a user. Alternatively, in some embodiments, a repeated convolution-based attention module may be specially configured to include a particular plurality of convolutional application layers, such as a first application layer and multiple iterations of a repeated convolutional application layer. Each convolutional application layer may produce a convolutional output, for example weight data based on the input parameter for that layer (e.g., the original input data or a convolutional output of a previous layer). The repeated convolution-based attention module may further be specially configured to augment the input parameter for a particular layer (or iteration of a layer) based on the convolutional output for that iteration or layer, for example using an addition or concatenation transformation, to produce an augmented convolutional output. The augmented convolutional output may then be used as the input parameter to the next convolutional application layer, or next iteration of a repeated convolutional application layer.

Upon utilizing all convolutional application layers, or all iterations thereof, the repeated convolution-based attention module may be specially configured to augment an attention input data object originally received by the repeated convolution-based attention module, based on a final augmented convolutional output produced by augmenting the final convolutional output of a final convolutional application layer or final iteration of a repeated convolutional application layer. This augmentation may produce an attention module output that maintains the input activations represented by the attention input data objects as well as the attention data represented by the final augmented convolutional output. In this regard, the attention module output may maintain the original properties and nature of the attention input data object, while including attention data that highly weights particular pixels and/or groups of pixels associated with high-level attention features learned to be important for the particular task for which the CNN is trained (within which the repeated convolution-based attention module is integrated).

In some embodiments, a repeated convolution-based attention module may advantageously perform one or more specific transformations to augment the output of each convolutional application layer and/or iteration thereof. In example embodiments, the repeated convolution-based attention module uses a concatenation transformation to augment the input of each convolutional application layer with the output of the convolutional application layer such that the original activation signal is maintained while new attention data is used to update the input parameter to include weights for higher-level attention features. Alternatively, the repeated convolution-based attention module may use an addition transformation for augmenting the input parameter of each convolutional application layer. By augmenting the input parameter based on the attention features produced by a particular convolutional application layer or iteration of the repeated convolutional application layer, the accuracy of subsequent layers or iterations may be improved using the augmented input parameter as the input parameter to the next layer.

Using a repeated convolution-based attention module, a small unit may be designed that is computationally inexpensive in comparison to conventional attention modules. The number of parameters is implicitly associated across each iteration of the repeated convolution-based attention module, decreasing the total number of parameters associated with the module. In this regard, the repeated convolutional module is configured to alter attention weights associated with each pixel through applying the module a desired number of times, thus improving pixel-level classification accuracy while limiting or otherwise reducing required computational resources and improving overall efficiency through enabling use of redundant hardware and/or software. The redundant hardware and/or software utilized by the small repeated convolution-based attention module enables the module to function with improved efficiency and accuracy without scaling the number of required parameters. Such implementations may be implemented in a resource-constrained environment to improve overall accuracy while utilizing minimal amounts of scarce computing resources.

In some embodiments, each convolutional application layer of the repeated convolution-based attention module may further be broken down into one or more sub-convolutional application layers. For example, attention data represented by an initial convolutional output may be generated by applying an input parameter to a first convolutional application layer of a plurality of convolutional application layers. The convolutional output data generated by the first convolutional application layer may be used to augment the input parameter and produce augmented convolutional output data that may be provided as the input parameter to the next convolutional application layer. This process may continue for all convolutional application layers, such that the final convolutional application layer and augmentation produce the attention module output, which may be used to augment the original input parameter (e.g., an attention input data object) using a transformation such as a concatenation transformation. Such embodiments provide customizability in configuring the various convolutional application layers while similarly leveraging the repetitional, redundant design of one or more repeated convolutional application layers to advantageous decrease overall resource usage. By configuring the individual convolutional application layers, some such embodiments may further improve computational efficiency, thus further reduce the computational resources used by the repeated convolution-based attention module.

Example implementations of a repeated convolution-based attention module utilize a simplified architecture that enables the repeated convolution-based attention module to be applied or otherwise integrated to various existing neural networks. In example implementations, an existing neural network may be updated to integrate the repeated convolution-based attention module, and may receive the output of the repeated convolution-based attention module as input to a subsequent, remaining processing layer of the existing network. In some such embodiments, for example, the repeated convolution-based attention module may be integrated to provide attention data to the existing neural network(s), thus improving the accuracy and/or efficiency of the existing network(s). The repeated convolution-based attention module may receive the same input as the existing neural network, and by preserving the nature of the input data, for example using the concatenation operation, the convolution-based attention module produces output readily received by the existing neural network. For example, the repeated convolution-based attention module may be integrated with various existing networks to provide attention data after retraining of the existing network, without updating the particular architecture of the existing network. In this regard, the repeated convolution-based attention module can be more readily integrated into existing neural network architectures without requiring modification of the existing neural network architecture, which saves human resource time and reduces cost to deploy the existing network with the repeated convolution-based attention module.

Example Systems and Apparatuses

A method, apparatus, and computer program product are provided herein, in accordance with example embodiments for image classification using a repeated convolution-based attention module. Embodiments described herein are uniquely capable of utilizing a repeated convolution-based attention module for improved accuracy of classifications. Additionally, the repeated convolution-based attention module utilizes a simplified structure that can be implemented in resource constrained environments, including systems with constrained processing resources, memory resources, networking resources, or the like.

FIG. 1 illustrates a block diagram depicting an example system for implementing example embodiments described herein. The system includes an image and location management server 104 in communication with one or more edge devices 102A-102N (collectively "edge devices 102"). The edge devices 102 are configured to communicate with the image and location management system 104 over one or more networks, for example network 106. Network 106 may be embodied by a wired, wireless, or any combination of wired and wireless communication networks. For example, the network 106 may be embodied by a cellular network, a Wi-Fi network, an Internet connected network, local area networks, or the like.

Edge devices 102 may be embodied via any number of mobile and/or terminal devices, each constrained with respect to one or many computing resources, for example due to the physical dimensions of the edge device. Within an example system, an edge device may process captured data close to the source of the information (e.g., immediately after capture or directly after pre-processing that occurs after capture), rather than using a data center or cloud environment to process the received data. For example, an edge device may be limited with respect to available processing resources, memory resources, power consumption resources, input/output resources, network resources (e.g., available system bandwidth), and/or the like. In some embodiments, for example, one or more of the edge devices 102 is embodied by a mobile device, compact camera device, satellite device, integrated system, or the like. In some embodiments, one or more of the edge devices 102 is integrated with a vehicle, for example a semi-autonomous or fully-autonomous vehicle, to perform navigation and/or control. For example, in some embodiments, one or more of the edge devices 102 may be integrated into an in-dash vehicle navigation unit, a vehicle head unit, an electronic control unit, or an advanced driver assistance system (ADAS) or a controller that facilitates autonomous or semi-autonomous driving. Additional, different, or fewer components may be provided in alternative embodiments.

In one embodiment, one or more of the edge devices 102 can be an in-vehicle navigation system, such as an ADAS, a personal navigation device (PND), a portable navigation device, a cellular telephone, a smart phone, a personal digital assistant (PDA), a smartwatch, a camera, a computer, and/or other device that can perform image processing and/or navigation-related functions. For example, any of the edge devices 102 may be configured to perform navigation and/or control based on captured image data. The edge devices 102 may perform some or all of such processes, and/or some or all of other processes associated with the same or other functionality, via communication with the image and location management system 104.

The edge device 102 may include, or be associated with, one or more sensors, image capture devices, and/or detector devices. The edge device 102 may collect various data via these devices. For example, one or more of the edge devices 102 may include, or be associated with, one or more image capture devices, cameras, global positioning system (GPS), LiDAR device(s), or the like. Captured image data may be collected in a raw format via one or more of the sensors, or a combination thereof. Alternatively or additionally, the captured image data may be pre-processed and/or altered based on one or more other captured sensor data. For example, captured image data may be altered based on location data, velocity and/or direction data, or the like, collected via one or more of the various sensors.

In some embodiments, each of the edge devices 102 may include limited computing resources. For example, any or each of the edge devices 102 may include limited memory resources, battery resources, processing resources, or a combination thereof. The edge devices 102 may include specialized hardware configured for performing one or more of the applications described herein.

In other embodiments, the system includes one or more mobile or fixed computing devices comprising processing circuitry and a memory without resource constraints. For example, a mobile device, server device, or the like may include a standard processor and memory configured to communicate via a bus. The memory may include instructions for performing one or more of the processes described below.

Image and location management system 104 may be embodied by one or more fixed or mobile computing devices. The image and location management system 104 includes, for example, a server 104A and a database 104B. The server 104A and/or the database 104B may be embodied entirely by hardware, entirely by software, or by a combination of hardware and software. In some embodiments, the server 104A may include one or more connected servers, devices, sub-systems, or the like. Additionally or alternatively, the database 104B may include one or more connected databases, datastores, ledges, or the like.

In some embodiments, the image and location management system 104 communicates with one or more of the edge devices 102 to perform and/or complete various actions. For example, in some embodiments, the image and location management system 104 communicates with an edge device, such as 102A, to provide training data to the edge device 102 for training a repeated convolution-based attention module and/or associated convolutional neural network. Alternatively or additionally, in some embodiments, the image and location management system 104 may communicate with edge device 102A to provide and/or otherwise install a trained convolutional neural network and/or trained convolution-based attention network to the edge device 102A. Alternatively or additionally, the image and location management system 104 may communicate with edge device 102A to provide stored image data for processing via the edge device 102A, which the edge device 102A may request for example. Further, in yet some embodiments, the image and location management system 104 may communicate with multiple of the edge devices 102 to receive attention module parameters, attention module output(s), and/or convolutional neural network output(s) for use in training a network in a distributed manner. For example, the image and location management system 104 may be configured for parameter synchronization (e.g., parameter averaging, asynchronous stochastic gradient descent, or by applying other synchronization algorithms) and distributing between edge devices 102.

The server 104A may be configured, via hardware, software, or a combination thereof, to provide functionality to the edge devices 102. For example, the server 104A may be configured via hardware and/or software to provide an imaging and mapping application, such that the user equipment may communicate with the image and location management system 104 via the server 104A to provide navigational, location, mapping, and other assistance to a user among other services provided through the image and location management system 104 and/or associated systems. In this regard, the server 104A may be configured, via hardware, software, or a combination thereof, to transmit signals to, and receive signals from, the network 106.

Database 104B may include one or more data types for facilitating image, location, mapping, and various other services. For example, database 104B may include node data, road segment data or link data, point of interest (POI) data, or the like. The database 104B may also include cartographic data, routing data, and/or maneuvering data. According to some example embodiments, the database 104B may, additionally or alternatively, include image data associated with various feature, locations, routes, or the like.

The database 104B, in some embodiments for example, includes and/or is configured to store and retrieve image data associated with images collected via image capture devices. The images may include one or more images captured via one or more cameras, and/or other image capture devices, mounted to or otherwise integrated into autonomous or semi-autonomous vehicles. In some embodiments, the database 104B may be configured to store images captured by or otherwise associated with one image capture vehicle, or a fleet of image capture vehicles. The image data may be collected via ground photography, aerial photography, satellite photography, or a combination thereof.

In some embodiments, the database 104B stores image data associated for use in training one or more machine learning models. For example, the database 104B may include image data for use in training a repeated convolution-based attention module, or one or more sub-models therein. The training image data may be associated with one or more labels and/or additional data, which may be automatically included in or associated with the image data or input by a human operator to enable training. In some embodiments, for example, the server 104A may enable access to and/or manipulation of database 104B to provide a human operator functionality to label and/or otherwise modify collected raw image data.

In some embodiments, the repeated convolution-based attention module may be integrated into a neural network, for example a convolutional neural network, that are trained together. In an example context, for example, as a convolutional neural network is trained based on a training data set, where the convolutional neural network includes a repeated convolution-based attention module, the repeated convolution-based attention module may similarly be trained to produce attention data based on the same training data set. In this regard, the repeated convolution-based attention model may be trained based on the backpropagated signal received from the objective function of the convolutional neural network within which the repeated convolution-based attention model is integrated. As the repeated convolution-based attention module improves providing attention data important for the task that the convolutional neural network is solving, the convolutional neural network improves in accuracy as well, and thus as accuracy increases will backpropagate a signal that will cause less change to the repeated convolution-based attention module as well. Accordingly, as the convolutional neural network is trained to improve the outputs provided for a particular task, the repeated convolution-based attention module improves as well to assist in minimizing the overall error for the network output(s).

Additionally or alternatively, the database 104B may be configured to store a parameter set for one or more edge devices, such as edge devices 102. The database 104B may, for example, be configured to receive the parameter set(s) received via the server 104A. The parameter set for a particular edge device, such as edge device 102A, may be updated upon subsequent training of the edge device 102A. The server 104A may communicate with the database 104B to store received parameter set(s) and retrieve stored parameter set(s). For example, database 104B may retrieve one or more stored parameter set(s) for various edge devices, and provide the retrieved parameter set(s) to server 104A for generating a synchronized parameter set for distribution to one or more of the edge devices 102 for use.

The database 104B may be embodied by one or more known database implementations. For example, the database 104B may be embodied by one or more network attached storages (NAS) devices, accessible via communication with the server 104A or another sub-system of the image and location management system 104. In other embodiments, the database 104B is embodied by an external device and/or server, which may be controlled and/or accessed by the image and location management system 104, for example via server 104A. For example, the database 104B may be embodied by one or more external devices accessed utilizing one or more application programming interfaces (APIs).

An example embodiment of an edge device, for example any of the edge devices 102, may be embodied as an apparatus, for example apparatus 200 as illustrated in FIG. 2. The apparatus 200 depicted in FIG. 2 may be specially configured in accordance with an example embodiment of the present disclosure for image classification using a repeated convolutional module. The apparatus 200, for example where the apparatus 200 is integrated with a semi-autonomous or autonomous vehicle, may be configured to perform improved image classification using the repeated convolutional module for improved navigation and control. For example, improved image classification may enhance decision-making associated with vehicle navigation and/or control.

The apparatus 200 includes a processor 202, memory 204, input/output module 206, communications module 208, one or more sensor(s) 210, and attention management module 212. In some embodiments, the apparatus 200 includes additional, alternative, or fewer modules. For example, in some embodiments, one or more modules include shared circuitry, components, or the like. In other embodiments, one or more modules is embodied by sub-modules and/or circuitry of another module. In some embodiments, for example, the attention management module 212 is embodied by software executed in conjunction with one or more of the other modules, such as via the processor 202 and/or memory 204.

The terms "circuitry" and "module" should be understood broadly to include hardware and, in some embodiments, software for configuring the hardware. For example, in some embodiments, "circuitry" and/or "module" may include processing circuitry, storage media, network interfaces, input/output devices, connection interfaces, and/or the like. In some embodiments, other elements of the apparatus 200 may provide or supplement the functionality of one or more particular modules. For example, the processor 202 may provide processing functionality to one or more of the modules, the memory 204 may provide storage functionality to one or more of the modules, the communications circuitry may provide network interface functionality to one or more of the modules, and the like.

The processor 202, in some embodiments, the processor 202 (and/or co-processor or any other processing circuitry assisting or otherwise associated with the processor) may be in communication with the memory 204 via a bus for passing information among components of the apparatus 200. The memory 204 is embodied by, or includes, one or more non-transitory memory components, devices, or storages. The memory 204, alternatively or additionally, may include one or more volatile and/or non-volatile memories, which may be in any combination and/or configuration. In other words, for example, the memory 204 may embody an electronic storage device, such as a computer readable storage medium. The memory 204 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the terms "processing circuitry," "processor," and/or "processing module" may be understood to include a single core processor, a multi-core processor, multiple processors internal to the apparatus, and/or remote or "cloud" processors.

In an example embodiment, the processor 202 may be configured to execute instructions stored in the memory 204, or otherwise accessible to the processor. Alternatively or additionally, the processor 202 may be configured to execute hard-coded functionality. As such, whether configured by hardware or software methods, or by a combination thereof, the processor may represent an entity (e.g., physically embodied in circuitry, or component modules) capable of performing operations according to an embodiment of the present disclosure while configured accordingly. Alternatively, as another example when the processor 202 is embodied as an executor of software instructions, the instructions may specifically configure the processor to perform the algorithms and/or operations described herein when the instructions are executed. For example, when the processor 202 is embodied as an ASIC, FPGA, or the like, the processor 202 may be specially configured hardware for conducting the operations described herein. In some embodiments, the processor 202 may be associated with a specific device (e.g., a pass-through display or a mobile terminal) configured to employ an embodiment of the present disclosure by further configuration of the processor by instructions for performing the algorithms and/or operations described herein. The processor may include, among other components, a clock, an arithmetic logic unit ("ALU"), logic gates, and/or circuitry components configured to support operation of the processor 202.

In some embodiments, the processor 202 may be configured to programmatically access data from and store data to one or more databases, for example a local image data database or database associated with the database 104B, which may be embodied by one or more modules or sub-modules thereof. For example, the database may be embodied by the memory 204 and/or combination of the memory 204 and processor 202.

In some embodiments, the apparatus 200, and/or one or more modules of the apparatus 200, may be embodied by a system on a chip ("SoC") or integrated circuitry specially designed for the functionality described below. For example, in some embodiments, the processor 202, memory 204, input/output module 206, and/or communications module 208, or a combination of one or more of these modules, may be embodied as a SoC. In some embodiments, for example in some such embodiments where at least the processor 202 and memory 204 are embodied in a SoC configuration, the apparatus 200 may include limited computing resources. In such embodiments, for example, the apparatus 200 may be limited based on processing resources associated with the processor 202, memory storage resources associated with the 204, networking resources associated with the communications module 208, or the like. As such, the apparatus 200 may embody or otherwise be associated with a particular resource constrained environment.

In some embodiments, the apparatus 200 may optionally include an input/output module 206 for providing an interface or elements thereof for rendering to a display or otherwise providing the interface or elements to a user. For example, the input/output module 206 may be configured to output, for rendering to a display, navigation information, a proposed navigation route, and/or other navigation or control information. Additionally or alternatively, the input/output module 206 may be configured to receive an indication of a user input. In some embodiments for example, the input/output module 206 may include a display for rendering such information, a keyboard, a mouse, a joystick, a touch screen, touch areas, soft keys, a microphone, a speaker, or other input/output mechanisms. In some embodiments, the apparatus 200 is in communication with the processor 202 and/or one or more other modules for performing the functionality described. Alternatively or additionally, the processor 202 may include input/output module 206 to control at least some functions of one or more user interface elements such as a display and, in some embodiments a speaker, ringer, microphone, and/or the like. The processor and/or input/output module 206 comprising the processor 202 may be configured to control one or more functions of one or more user interface elements through computer program instructions (e.g., software and/or firmware) stored on a memory associated with the processor 202, for example memory 204 and/or the like.

In some embodiments, the apparatus 200 optionally comprises a communication module 208. The communications module 208 may be any means, such as a device, circuitry, or module, embodied in either hardware or a combination of hardware and software that is configured to receive and/or transmit data from and/or to a network, and from and/or to any other devices, modules, or components in communication with the apparatus 200. In this regard, the communication module 208 may include, for example, an antenna or multiple antennas, and/or supporting hardware, software, or a combination thereof, for enabling communications with a wireless communication network. Additionally or alternatively, the communication module 208 may include the circuitry, components or the like for interacting with the antenna(S) to cause transmission of signals via the antenna(s), or to handle receipt of signals received via the antenna(s). In some environments, the communication interface may alternatively or also support wired communication. As such, for example, the communication module 208 may include a communication modem, and/or other hardware/software for supporting communication via cable, digital subscriber line ("DSL"), universal serial bus ("USB"), or other mechanisms.

The one or more sensor(s) 210 may comprise any number of sensing devices, image capture devices, navigation devices, ranging devices, and or the like. For example, the sensor(s) 210 may include a location sensor such as a GPS sensor or a global navigation satellite system (GNSS) sensor; an inertial measurement unit (IMU) sensor(s); camera(s); two dimensional and/or three dimensional light detection and ranging (LiDAR) sensor(s); long, medium, and/or short range radio detection and ranging (RADAR) sensor(s); ultrasonic sensor(s); electromagnetic sensor(s); infrared (IR) or near-IR cameras; three dimensional (3D) cameras; 360 degrees camera(s); and/or other sensors that enable the apparatus to capture various data types, including various types of image data, representing features of the apparatus' surrounding environment, and/or other components configured to perform various operations, procedures, functions or the like as described herein.

In some embodiments, the apparatus 200 includes, or otherwise is associated with, attention management module 212. Attention management module 212, in some embodiments, includes hardware, software, or a combination thereof for generating an attention module output using a repeated convolution-based attention module. In this regard, for example, the attention management module 212, alone or in conjunction with one or more other modules, may be configured via hardware, software, or a combination thereof to receive an attention input data object. Additionally or alternatively, in some embodiments, the attention management module 212, alone or in conjunction with one or more other modules, may be configured via hardware, software, or a combination thereof, to apply a received attention input data object as an input parameter to a repeated convolution-based attention module. The repeated convolution-based attention module may be trained, in some embodiments, to apply the input parameter to at least one convolutional application layer to produce a convolutional output, and augment the input parameter (e.g., based on the convolutional output) to produce an attention module output, for example via one or more transformations (e.g., an addition transformation or a concatenation transformation, for example). The attention management module 212 may, additionally or alternatively, be configured to repeat utilization of the repeated convolution-based attention module, for example based on an identified attention repetition threshold. In this regard, the attention management module 212 may include hardware, software, or a combination thereof, to apply the attention module output from the repeated convolution-based attention module back as the input parameter to the repeated convolution-based attention module to produce a new attention module output. The attention management module 212 may include tracking and/or counting hardware, software, or a combination thereof, alone or in combination with one or more other modules, to determine when to cease repetition (e.g., when the module has been repeated equal to a threshold attention repetition threshold. The attention management module 212 may further include software, hardware, or a combination thereof, to output an attention module output, and/or apply the attention module output to a remaining neural network processing layer of the neural network within which the repeated convolution-based attention module is integrated, which may be embodied in hardware, software, or a combination thereof. In some embodiments, the remaining neural network processing layer includes at least one convolutional layer, fully connected layer, or the like. In some embodiments, the remaining neural network processing layer includes a first layer of a second repeated convolution-based attention module.

In some embodiments, the attention management module 212 may utilize one or more other modules to perform operations associated with the functionality provided via the module. For example, the attention management module 212, in some embodiments, communicates with or is embodied, fully or partially, by the processor 202 for processing instructions stored by the memory 204 associated with generating, training, maintaining, and/or utilizing a repeated convolution-based attention module. For example, the attention management module 212 may leverage the processor 202 and/or memory 204 for processing and instruction execution functionality, respectively. Additionally or alternatively, the attention management module 212 may leverage sensor(s) 210 to receive an attention input data object, for example by capturing the attention input data object using one or more sensors, or capturing raw image data and pre-processing the raw image data to produce the attention input data object. Alternatively or additionally, in some embodiments, the attention management module 212 may utilize one or more other modules, such as communications module 208, to receive the attention input data object. For example, the attention management module 212 may receive the attention input data object from one or more other edge devices or a coordinating central server, system, or device, such as from an image and location management system 104.

Additionally or alternatively, in some embodiments, the attention management module 212 may include hardware, software or a combination thereof to train a repeated convolution-based attention module and/or the convolutional neural network within which the repeated convolution-based attention module is integrated. For example, the attention management module 212 may be configured to access one or more databases, embodied via memory 204 and/or external devices, servers, systems or the like, and/or utilize sensor(s) 210, to retrieve various types of image training data. The image training data may be tagged, automatically or via a human operator, and used to train the repeated convolution-based attention module, or sub-layers thereof (e.g., one or more convolutional layers) for example.

Alternatively, the attention management module 212, alone or in conjunction with one or more other modules such as the processor 202 and memory 204, may be configured to provide one or more trained modules and/or models to the apparatus 200 for utilization. For example, the modules, such as a repeated convolution-based attention module, may be trained by an external device, apparatus, or system, such as an image and location management system 104 or a related device, apparatus, or system, and transmitted or otherwise downloaded and/or installed for utilization by the apparatus 200.

Additionally or alternatively, the attention management module 212, alone or in conjunction with one or more other modules such as the processor 202 and/or memory 204, may be configured to provide functionality associated with a trained convolutional neural network that utilizes the repeated convolution-based attention module. For example, in some embodiments, the attention management module 212 includes custom hardware, software, or a combination thereof embodying a trained convolutional neural network for a classification, detection, or other image processing task, which includes the repeated convolution-based attention module. In other embodiments, to embody a trained convolutional neural network that utilizes the repeated convolution-based attention module, the attention management module 212 may provide attention data to the processor 202 and/or memory 204, which may embody the trained convolutional neural network.

In some embodiments, the apparatus 200 optionally includes or is otherwise associated with one or more modules for navigation and/or control. For example, in some embodiments where the apparatus 200 is included or otherwise integrated into a semi-autonomous or fully autonomous vehicle, the apparatus 200 may include or be associated with navigation systems, GPS, perception and/or decision-making systems, ADAS, and/or other assistance systems, or a combination thereof. The navigation system, perception system, decision making system, ADAS, or the like may perform one or more actions based on information collected by, produced by, or otherwise made available via the modules of apparatus 200. For example, the various systems may utilize attention module outputs produced by the apparatus 200 via one or more modules thereof, for example via the attention management module 212 in conjunction with the processor 202, memory 204, and/or sensor(s) 210. Alternatively or additionally, the various systems may utilize image classification outputs produced by, or otherwise made available via the modules of apparatus 200, for example via the same modules or a subset thereof. It should be appreciated that, in this regard, the apparatus 200 may serve as a sub-module, sub-component, or sub-system of a device, system, or apparatus, where the modules of the apparatus 200 provide specific functionality and/or data to one or more related sub-systems or devices.

Example Component Data Flow

Having explained an example system and apparatus of the present disclosure, disclosure will now turn to particular components executed via software, hardware, or a combination thereof. For example, FIG. 3 illustrates a particular component diagram of a specially configured system in accordance with an example embodiment of the present disclosure. It should be appreciated that the components depicted may be embodied by apparatus 200, a sub-module of the apparatus 200, or a combination of sub-modules of the apparatus 200. For example, the image capture device(s) 302A may be embodied by sensor(s) 210, and/or sensor(s) 210 in conjunction with processor 202, memory 204, communications module 208, or a combination thereof. Further, input image database 302B may be embodied by memory 204, processor 202, communications module 208, or a combination thereof. Repeated convolution-based attention module 304 may be embodied by attention management module 212, and/or attention management module 212 in conjunction with memory 204 and/or processor 202, for example. Remaining neural network processing layer 306 may similarly be embodied by attention management module 212, and/or attention management module 212 in conjunction with memory 204 and/or processor 202. It should be appreciated that, in other embodiments, alternative or additional combinations of modules may embody each component. In some embodiments, for example, the component system may embody a subsystem of a semi-autonomous or autonomous vehicle.

In some embodiments, a system includes image capture device(s) 302A to capture image data and transmit captured image data for processing. For example, the image capture device(s) 302A may capture attention input data object 308A. Attention input data object 308A may represent captured image data associated with the environment surrounding the image capture device(s) 302A. In this regard, the attention input data object 308A may embody raw data captured via the image capture device(s) 302A.

In some embodiments, the attention input data object 308A includes raw and/or pre-processed image data associated with multiple image capture devices. In this regard, the image capture devices, in conjunction with a processor, for example, may combine image data or otherwise augment raw image data from one or more of the image capture devices to produce the attention input data object 308A. The attention input data object 308A may be associated with a particular image data format usable by the repeated convolution-based attention module.

The image capture device(s) 302A, in at least some embodiments, may be communicably coupled with the repeated convolution-based attention module such that the attention input data object 308A is captured and transmitted in real-time. Alternatively, in some embodiments, the attention input data object 308A may be received from the image capture device(s) in near-real time, for example due to a processing delay introduced by one or more pre-processing steps. In some embodiments, the attention input data object 308A is produced, via one or more components, in a format interpretable and/or predetermined by the repeated convolution-based attention module 304. For example, the attention input data object 308A may be formatted and/or pre-processed in association with a particular type, size, color format, encoding schema, and/or the like, or a combination thereof.

In some embodiments, the system includes input image database 302B. The input image database 302B may be embodied by one or more local databases storing one or more attention input data object(s). Alternatively, in some embodiments, input image database 302B may be embodied by one or more databases located on a remote device, server, or system. For example, the input image database 302B may be embodied by one or more databases controlled by an image and location management system.

The input image database 302B may be utilized to receive image data, for example attention input data object 308B. In some embodiments, the input image database 302B is queried to receive the attention input data object 308B. The attention input data object 308B may be retrieved as result data in response to the query. For example, the input image database 302B may be queried based on a position in a local map, such as to receive attention input data object(s) associated with the features of the environment at the local position. In some such embodiments, the attention input data object 308B may have been previously collected, for example during a map generation session where features were captured using one or more sensors at a different time.

In some systems, image data is received from both image capture device(s) 302A and input image database 302B. In other embodiments, image data corresponding to an attention input data object is received from only the image capture device(s) 302A, or only the input image database 302B. For example, in some embodiments no input image database 302B may be included.

In some embodiments, the image data received from the capture device(s) 302A and/or input image database 302B may be pre-processed, for example by one or more convolutional layers and/or one or more previous modules, including one or more repeated convolution-based attention modules, of a convolutional neural network that similarly integrates at least the repeated convolution-based attention module 304 and remaining neural network processing layer 306. In an example context, one or more pre-processing layers may transform the image data into a feature map associated with the original image data. The feature map, for example, may be produced via using one or more convolutional layers as pre-processing layers, which may generate a feature map with any dimensionality. For example, the dimensionality may be determined based on the number of features represented by the feature map. The feature map may then be input to the repeated convolution-based attention module 304, for example where the feature map represents or otherwise embodies an attention module input. Additionally or alternatively, in some embodiments, the image data may be processed by a first repeated convolution-based attention model that outputs data for inputting into the repeated convolution-based attention model 304. For example, a first attention module output generated by the first repeated convolution-based attention module (not shown) may be provided as input to the repeated convolution-based attention module 304.

The repeated convolution-based attention module 304 is configured to produce an attention module output based on the attention input data object. The repeated convolution-based attention module 304 may produce the attention module output using multiple iterations of a particular machine learning algorithm, model, or the like. For example, the repeated convolution-based attention module 304 may be embodied by one or more machine learning models, such as one or more convolutional neural networks, configured and/or otherwise trained to generate an attention module output based on a particular input parameter. The repeated convolution-based attention module 304 may utilize an attention module output as a subsequent input parameter to the repeated convolution-based attention module 304. During such intermediate outputs, the repeated convolution-based attention module 304 may transform the previous input parameter based on the attention module output, for example by concatenating the previous input parameter with the corresponding attention module output for that input parameter. Alternatively, in some other embodiments the input parameter is transformed by the attention module output using a different transformation, such as an addition transformation, or the like.

The repeated convolution-based attention module 304 may be tuned, automatically or by a user, to iterate based on an attention repetition threshold. For example, in some embodiments, the repeated convolution-based attention module 304 is designed such that the attention repetition threshold is received, for example from a user, as a hard-coded parameter. The attention repetition threshold may represent a numerical threshold number of times for which an input parameter should be applied to the module. In some such embodiments, the repeated convolution-based attention module 304 is configured to track the number of iterations that have been completed. For example, the repeated convolution-based attention module 304 may include a counter, or other mechanism configured to track a repetition count, and compare the repetition count to the attention repetition threshold. An attention module output 310 may be produced by the convolutional attention module 304 after the iteration of the repeated convolution-based attention module where the repetition count satisfies the attention repetition threshold, such as where the repetition count and threshold are equal. In some such embodiments, the repeated convolution-based attention module 304 may be trained to iterate based on the attention repetition threshold.

In some embodiments, the repeated convolution-based attention module 304 is configured to provide the attention module output 310 to the remaining neural network processing layer 306. The remaining neural network processing layer 306 may be configured to, based on the attention module output as an input to the remaining neural network processing layer 306, output a corresponding improved, enhanced accuracy image classification 312. In some embodiments, the remaining neural network processing layer 306 is configured to output multiple image classifications based on the attention module output 310. For example, each image classification 312 may be associated with a particular feature, or set of features, captured in the original attention input data object 308A or 308B.

The image classification(s) 312 may be output by the remaining neural network processing layer, or generally by the system, for a myriad of purposes. In some embodiments, the image classification(s) 312 may be output to a display, for example to render to a user associated with the system. Alternatively or additionally, the image classification(s) 312 may be output to a perception system, navigation system, and/or control system to enable decision-making based on the image classification(s) 312. For example, in some embodiments associated with an autonomous and/or semi-autonomous vehicle, the image classification(s) 312 may be used by perception and/or decision-making systems for navigation, to control the vehicle, or the like.

The repeated convolution-based attention module 304, in other embodiments, may be integrated in any location within a neural network (e.g., a classification neural network, a detection neural network, or another neural network designed for a particular task), for example remaining neural network processing layer 306. In some embodiments, for example, the repeated convolution-based attention module 304 is integrated as a set of intermediate layers and operations of a deep learning neural network, such as a CNN. For example, the CNN may apply a captured image data and/or pre-processed image data to one or more convolutional layers for pre-processing before inputting the pre-processed data, for example embodied by original attention input data object 308A or 308B, to the repeated convolution-based attention module 304.

Additionally or alternatively, in some embodiments, the final attention output produced by the repeated convolution-based attention module 304 may be further processed by one or more subsequent layers, for example one or more remaining convolutional application layers, of the CNN within which the repeated convolution-based attention module 304 is integrated. For example, the remaining neural network processing layer 306 may embody a first remaining processing layer of a plurality of remaining layers in the CNN. Alternatively or additionally, in some embodiments, the attention module output 310 produced by the repeated convolution-based attention module 304 may be input into another module integrated by the CNN, for example a second convolution-based attention module. It should be appreciated that a neural network may integrate any number of repeated convolution-based attention modules located anywhere within the architecture of the neural network, and may include one or more repeated convolution-based attention modules immediately after one another, or separated by one or more convolutional application layers.

Example Image Data Representations

FIG. 4 illustrates an example input and output image representation in accordance with an example embodiment of the present disclosure. Specifically, FIG. 4 includes attention input data object 402, and attention module output representation 404. The attention input data object 402 may have been captured by one or more sensor(s), for example a camera and/or image capture device associated with a fully-autonomous or semi-autonomous vehicle. Alternatively, the attention input data object 402 may be pre-processed data based on one or more pre-processing steps and/or layers of a neural network.

The attention input data object 402 includes a myriad of features that may be of interest for performing various tasks, for example object detection. For example, the attention input data object 402 includes the portion of the capture vehicle, a third-party vehicle, one or more lane lines or other road markings, one or more street signs and/or traffic signals, a sky, and the like. Each of these features, or a subset thereof, may be classified and utilized for location, navigation, and/or decision-making purposes.

The attention input data object 402 may further be associated with particular metadata and/or image parameters. For example, the attention input data object may be associated with a particular size (e.g., height and width dimensions), a particular encoding format, a particular color format, or the like. In other embodiments, metadata and/or one or more image parameters associated with the attention input data object 402 may be different from that depicted in FIG. 4. For example, the image may be associated with a different size, different color formatting, different encoding, or a combination thereof.

FIG. 4 further depicts an example attention module output 404, for example produced by an example repeated attention module output based on the attention input data object 402, in accordance with an embodiment of the present disclosure. Specifically, the attention module output 404 comprises a multidimensional feature map, which comprises attention data representing the attention features emphasized by a corresponding repeated convolution-based attention module. The multidimensional feature map may be outputted or otherwise produced, for example by the apparatus 200, for rendering to a display, for example such that the multidimensional feature map is outputted as an encoded image. The attention module output 404 depicts individual pixels rendered based on the weights provided by the multidimensional feature map, for example based on the importance of the pixel towards a particular task. For example, various attention features identified within the attention input data object 402 may be depicted in different grayscale color values.

In this regard, the attention module output 404 draws attention to edges and textures as compared to uniform areas such as the road or sky. Such attention features may be particularly useful in performing a particular task, for example object detection. The attention module output 404 represents such edges and textures as highly weighted by depicting such pixels in a color closer to white. The particular weights representing the attention module output 404 may be produced by a particular trained repeated convolution-based attention module. The trained repeated convolution-based attention module may, using one or more intermediate convolutional application layers, develop specific aspects of the attention input data object that should be given attention associated with the task for which the module is trained. In this regard, the weights associated with a particular pixel may not be directly tied to the pixel on a pixel-level alone, but rather represent the importance of the particular pixel in correlation with the aspects determined by the module that should be given attention (e.g., edges, texture, and the like). The weights of each pixel may then help inform one or more subsequent layers, for example a remaining neural network processing layer of a convolutional network, to improve the accuracy of classifications based on the highly weighted pixel values (e.g., based on the pixels given attention as important to the task).

It should be appreciated that, in other embodiments, the attention module output may be associated with various data types, formats, and representations. For example, the attention module output 404 may be represented using the reverse grayscale coloring, such that black represents a higher weight. Alternatively, the weights could correspond to the pixel color value, for example determined based on a red green blue (RGB) color model, a red green blue alpha (RGBA) color model, a hue saturation value (HSV) color model, a hue saturation lightness (HSL) color model, or other color formats. In some example contexts, the attention module output represents weights using a floating point or other decimal number.

Example Operations and Processes for Using a Repeated Convolution-Based Attention Module FIG. 5 illustrates an example process for generating attention data, for example an attention module output, using a repeated convolution-based attention module, for example performed via one or more components of an edge device embodied by apparatus 200. The illustrated process may, in some embodiments, be performed by a sub-module of an autonomous or semi-autonomous vehicle. The generated attention data, such as the attention module output, may be used for various purposes, such as to output for rendering or otherwise providing to a user, and/or to output to one or more other models, systems, devices, or the like.

Optional operational blocks are depicted using broken/dashed lines. It should be appreciated that, in some embodiments, all of the optional blocks may be performed. In other embodiments, none of the optional blocks may be performed. Alternatively, in some embodiments, one or more, but not all, of the optional blocks may be performed. Such optional blocks should not limit the scope or spirit of the disclosure herein.

When trained, the repeated convolution-based attention module produces an attention module output that pays attention to relevant features identified within in the attention input data object. The particular attention drawn to these features, for example represented by higher activation weights in an attention module output, is built by repeated application of a repeated convolutional application layer throughout multiple iterations. Particularly, applying multiple iterations of the same repeated convolutional application layer to the input parameter highlights features that are more relevant towards a particular image processing problem, and thus special attention is given to those features in the attention module output. By leveraging the repeated-nature of such modules, this attention is developed to be highly accurate without significant computational resource requirements associated with an increasing parameter base.

At block 502, the apparatus 200 includes means, such as sensor(s) 210, attention management module 212, input/output module 206, communications module 208, processor 202, and/or the like, or a combination thereof, for receiving an attention input data object. In some embodiments, the attention input data object is captured by an image capture device, for example via one or more of the sensor(s) 210. In some such embodiments, the attention input data object may be captured in real-time. Alternatively, the attention input data object may be captured in near-real time, with some pre-processing of the captured data such that it is interpretable by the apparatus and/or the attention management module 212. In other embodiments, the attention input data object is received by retrieving the attention input data object from one or more databases. In some such embodiments, the attention input data object may have been previously captured and stored. In some embodiments, the attention input data object is retrieved from a local database associated with the apparatus 200. In other embodiments, the attention input data object is retrieved from a remote system, database, or the like, for example from an image and location management system communicable with the apparatus 200.

The attention input data object may represent a captured representation of an environment associated with one or more sensor(s). For example, in an example where the apparatus 200 embodies a sub-system integrated into or otherwise associated with an autonomous vehicle or semi-autonomous vehicle, the attention input data object represents a captured portion of the environment around the vehicle. For example, the attention input data object may be a camera image captured associated with a particular radius or region around the vehicle.

The attention input data object may include various features for decision-making, navigation, and control of the autonomous vehicle. For example, the attention input data object may include signposts, traffic signals, other vehicles, pedestrians, buildings, lane markers, crosswalks, roadway images, sidewalks, and/or the like. The attention input data object may also include background imagery and/or pixels not dedicated to features relevant for a particular task, such as pixels representing sky, objects at a significant distance such as mountains, and the like. In this regard, the attention input data object of one example includes some pixels that are highly important towards a particular task (e.g., immediate control of an autonomous or semi-autonomous vehicle), such as cones, pedestrians, objects, lane markers, and the like that should be given attention.

The attention input data object may be received as pixel data representing, or otherwise embodying, the representation of the image and/or a corresponding pre-processed representation, such as a feature map which may have any associated dimensionality. For example, the attention input data object may be received as data comprising RGB data for each pixel associated with the attention input data object. In other words, the attention input data object may comprise multiple channels that form the attention input data object (e.g., a red channel, a blue channel, and a green channel). In other embodiments, the attention input data object may comprise one or more alternative channels, further increasing the dimensionality associated with the attention input data object.

In some embodiments, the attention input data object may represent a feature map. For example, the feature map may be generated by pre-processing a captured or retrieved input via one or more layers of a convolutional neural network. In an example context, an input image, captured via one or more sensor(s) or retrieved from a database, may be input to one or more convolutional layers to produce the feature map. Additionally or alternatively, an input image may be pre-processed by one or more other layers of the convolutional neural network before being provided to the repeated convolution-based attention module.

In some embodiments, the apparatus 200 further includes means, such as attention management module 212, processor 202, and/or the like, or a combination thereof, for applying the attention input data object to a repeated convolution-based attention module. The repeated convolution-based attention module may include various operations for producing, or otherwise outputting, a particular attention module output based on the received attention input data object.

The repeated convolution-based attention module may embody various operations that may be repeated a number of times. For example, in some embodiments, the repeated convolution-based attention module may be associated with an attention repetition threshold, such that information is applied to the repeated convolution-based attention module for a number of times based on the attention repetition threshold. In at least one embodiment, for example, the repeated convolution-based attention module may comprise at least blocks 504 and 506, as described below, which may be repeated for each iteration of input applied to the repeated convolution-based attention module.

At block 504, the apparatus 200 includes means, such as attention management module 212, processor 202, and/or the like, or a combination thereof, for augmenting the attention input data based on a convolutional output to produce an input parameter. In some embodiments, the attention input data object is augmented based on a convolutional output produced by a previous iteration of a repeated convolutional application layer, if any. In some embodiments, at or before the first iteration of the repeated convolutional application layer, the apparatus 200 may not have any convolutional output from a previous iteration because no such iteration was performed. In some such embodiments, the apparatus 200 may augment the attention input data object using a default data object, for example a zero matrix with the same depth as the attention input data object. In subsequent iterations, the apparatus 200 may, for example, augment the attention input data object to reflect the attention features represented or embodied by the convolutional output produced by a previous iteration.

In some embodiments, the apparatus 200 augments the attention input data object using a concatenation transformation based on the convolutional output produced by the previous iteration of the repeated convolutional application layer. Using the concatenation transformation, the apparatus 200 may append the data representing the attention features from the convolutional application layer to the attention input data object. In some examples, the input parameter produced by concatenating the attention input data object and the convolutional output of the previous iteration of the repeated convolutional application layer enables propagation of the original input signal (e.g., the attention input data object) together with data associated with identified attention features (e.g., the convolutional output), for example to improve identification of relevant attention features using subsequent iterations of the repeated convolutional application layer.

In other embodiments, other transformations may be used to augment the attention input data object. For example, in some embodiments the apparatus 200 augments the attention input data object, based on the convolutional output produced by a previous iteration, using an addition transformation. In some examples, the input parameter produced via the addition transformation may not include the attention input data object, such that only the attention features built over several iterations of convolutional outputs in addition to the attention input data object are propagated as input to a subsequent iteration of a repeated convolutional application layer.

At block 506, the apparatus 200 includes means, such as attention management module 212, processor 202, and/or the like, or a combination thereof, for applying the input parameter to a repeated convolutional application layer. For example, for the first iteration, the attention input data object augmented by a zero matrix may be provided as the initial input parameter to a first iteration of the repeated convolutional application layer. For subsequent iterations, to produce the input parameter for the current iteration, the attention input data object may be augmented by the convolutional output produced by the previous iteration of the repeated convolutional application layer. The convolutional output may identify, or be associated with one or more attention features, such that the convolutional output emphasizes or otherwise "draws attention" to the attention features learned by the repeated convolutional application layer based on a particular task. For example, the convolutional output may weigh particular pixels, or regions of pixels, higher if the pixel(s) is/are associated with a particular attention feature. The repeated convolutional application layer may learn the attention features most useful in mapping the input to the output values, such that no particular example feature, heuristic, or filter (or set thereof) need be provided as input by a user.

The repeated convolutional application layer, in some such embodiments, may be configured to analyze both portions of the input parameter (e.g., the attention input data object and the convolutional output produced by the previous iteration. In this regard, the repeated convolutional application layer in such applications may embody a kernel that matches the shape of the augmented data. For example, the kernel may match the depth of the concatenated attention input data object and convolutional output. To maintain the repeated nature of the module, the repeated convolutional application layer may produce output having a shape that matches the shape of the attention input data object.

At block 508, the apparatus 200 includes means, such as attention management module 212, processor 202, and/or the like, or a combination thereof, for determining whether to repeat applying the input to the convolutional application layer. In some embodiments, for example, the apparatus 200 identifies an attention repetition threshold, and repeats iterations based on the attention repetition threshold. In some embodiments, for example, the apparatus 200 maintains a repetition count that is increased or decreased upon each iteration until the repetition count satisfies the attention repetition threshold (e.g., the repetition count is incremented to equal or exceed the repetition threshold, the repetition count is decremented to zero, or the like), at which point the apparatus 200 ceases iterations of the repeated convolutional application layer. For example, in some embodiments, the repetition count is increased for each time utilizing the convolutional application layer and augmenting the input, which is repeated until the repetition count equals the attention repetition threshold (e.g., 4 iterations in a circumstance where the attention repetition threshold equals 4).

In some embodiments, the attention repetition threshold may be tuned by a user of the system, for example as a hyperparameter associated with the repeated convolution-based attention module maintained by the apparatus 200. In this regard, the attention repetition threshold may be customized and set based on the computing resources available in each implementation, desired accuracy, and/or experimental results associated with various attention repetition thresholds. For example, in some embodiments, the attention repetition threshold may be incremented until a desired accuracy level is achieved and/or until subsequent iterations would decrease computational efficiency or otherwise be impossible or impractical due to resource constraints.

In some embodiments, in a circumstance where the apparatus 200 determines another iteration of the convolutional application layer should be performed (for example, where a repetition count does not yet satisfy an attention repetition threshold), the process returns to block 504. In this regard, the apparatus 200 may augment the attention input data object based on the convolutional output produced by the previous iteration of the repeated convolutional application layer, producing an updated input parameter for the new current iteration. By applying an updated input parameter, the same repeated convolutional application layer may be repeatedly executed to analyze the updated input parameter and further improve the attention data represented or embodied by the convolutional output of each iteration of the repeated convolutional application layer without increasing the number of parameters associated with multiple different convolutional application layers. In examples where each input parameter is generated using a concatenation transformation, the attention input data object, as well as the attention features identified via the previous iteration and represented in the previous convolutional output, may be propagated forward for use by subsequent iterations of the repeated convolutional application layer. Alternatively, where an addition transformation is used to generate each input parameter for each iteration, each input parameter may represent a representation of the attention input data object emphasized based on the attention features represented by the convolutional output of the previous repeated convolutional application layer. As such, the accuracy of importance of the attention features represented by the produced convolutional output may be improved with each iteration of the convolutional application layer.

In a circumstance where the apparatus 200 determines, at block 508, that the convolutional application layer should not be repeated, the process continues to block 510. At block 510, the apparatus 200 includes means, such as attention management module 212, processor 202, memory 204, and/or the like, or a combination thereof, for augmenting the attention input data object based on the final convolutional output to produce an attention module output. The final convolutional output may be the convolutional output produced by the final iteration of the repeated convolutional application layer. In some embodiments, the attention input data object may be augmented using a concatenation transformation that concatenates the final convolutional output. The final convolutional output, produced by the final iteration the convolutional application layer, represents the attention data identified via repetition of the repeated convolutional application layer. The concatenation transformation generates an attention module output that preserves the original attention input data object and the attention data represented by the final convolutional output. In other embodiments, other transformations, such as an addition transformation, may be used to augment the attention input data object and generate the attention module output.

In some embodiments, the attention module output comprises a multidimensional feature map. Specifically, the multidimensional feature map emphasizes attention features identified within the attention input data object. In this regard, the multidimensional feature embodies the particular attention data developed to emphasize such attention features using various iterations of the repeated convolutional application layer and corresponding augmentation(s). The multidimensional feature map may be processed by encoded for further processing, outputting, or other action performed by the apparatus 200 or an associated system.

At block 512, the apparatus 200 includes means, such as attention management module 212, input/output module 206, communications module 208, processor 202, and/or the like, or a combination thereof, for outputting the attention module output. The attention module output, in some embodiments, includes the concatenation of the attention input data object and the final attention data represented by the final convolutional output. In this regard, the outputted or otherwise produced attention module output may include data associated with the original input parameter (e.g., the attention input data object), and subsequent attention features identified as important for a particular task via the various iterations of the repeated convolutional application layer for building the convolutional output(s) of each subsequent iteration of the repeated convolutional application layer.

In some embodiments, the attention module output is produced or otherwise outputted for rendering, or otherwise displaying, to a user. For example, the apparatus 200 may transmit signals representing and/or associated with the attention module output to render an interface associated with the attention module output. In some embodiments, the attention module output is outputted to another system, module, or the like.

Alternatively, in some embodiments, the attention module output is produced or otherwise outputted to one or more layers of a neural network within which the repeated convolution-based attention module is integrated. For example, the attention module output may be produced and input into a subsequent convolutional application layer for further processing. In another example context, the attention module output may be produced and provided as input to a subsequent repeated convolution-based attention module for further processing. The attention module output may be processed by the subsequent layer(s) and/or module(s) to improve the accuracy of the analysis of the subsequent layer(s) and/or module(s) based on the attention data included in the attention module output.

For example, in some embodiments, the apparatus 200 is configured for outputting the attention module output to another neural network model comprising one or more additional processing layers, and/or an associated system, for further processing. At block 514, for example, the apparatus 200 includes means, such as attention management module 212, processor 202, and/or the like, or a combination thereof, for applying the attention module output to a remaining neural network processing layer. In some embodiments, the remaining neural network processing layer may include one or more convolutional application layer(s), pooling layer(s), non-linearity layer(s), fully-connected layer(s), and/or the like, with which the repeated convolution-based attention module is integrated. Alternatively or additionally, the remaining neural network processing layer may be configured to process the attention module output to generate an image classification, multiple image classifications, or other task-specific data, associated with the attention input data object based on the attention module output. For example, the remaining neural network processing layer may generate one or more labels associated with various regions of the attention input data object, such as to label features present in the image (e.g., vehicles, objects, lane markers, and the like). In this regard, the remaining neural network processing layer may be configured to determine the classifications, labels, or the like, based at least on the attention regions represented by the attention module output. In embodiments where each intermediate attention module output is concatenated to the input parameter for that iteration, the remaining neural network processing layer may be trained to classify features with improved accuracy based on the various attention features represented by the final augmented convolutional output included in the attention module output.

FIG. 6 illustrates yet another example process for generating attention data, for example represented by an attention module output, using a repeated convolution-based attention module, for example performed via the apparatus 200 or one or more components thereof. In some embodiments, the repeated convolutional application layer is embodied as a single layer. Alternatively, in some embodiments, the repeated convolutional application layer is embodied as multiple layers. For example, the repeated convolutional application layer may be embodied by multiple sub-convolutional application layers configured for execution in sequence to produce attention data. The illustrated process may, in some embodiments, be performed by a sub-module of an autonomous or semi-autonomous vehicle. The generated attention data, such as the attention module output, may be used for various purposes, such as to output for rendering or otherwise providing to a user, and/or to output to one or more other models, systems, devices, or the like.

Optional operational blocks again are depicted using broken/dashed lines. It should be appreciated that, in some embodiments, all of the optional blocks may be performed. In other embodiments, none of the optional blocks may be performed. Alternatively, in some embodiments, one or more, but not all, of the optional blocks may be performed. Such optional blocks should not limit the scope or spirit of the disclosure herein.

In some such embodiments, the convolution-based attention module embodied by apparatus 200, or a component thereof, for performing one or more of the operations depicted, when trained, may similarly produce an attention module output that pays attention to relevant features represented in the attention input data object. Specifically, the operations depicted with respect to FIG. 6 may further enhance computational efficiency associated with generating the attention module output while maintaining the memory computational resource improvements provided by utilizing multiple iterations of a repeated convolutional application layer. Additionally, the operations depicted with respect to FIG. 6 may allow customizability in configuring the architecture for the first computational application layer and repeated convolutional application layer.

At block 602, the apparatus 200 includes means, such as sensor(s) 210, attention management module 212, input/output module 206, communications module 208, processor 202, and/or the like, or a combination thereof, for receiving an attention input data object. The attention input data object may, for example, be applied to an initial convolutional application layer. In some embodiments, the attention input data object is captured by an image capture device, for example via one or more of the sensor(s) 210. In some such embodiments, the attention input data object may be captured in real-time. Alternatively, the attention input data object may be captured in near-real time, with some pre-processing of the captured data such that it is interpretable by the apparatus 200 and/or a particular module thereof, the attention management module 212. For example, in some embodiments, captured image data is transformed by one or more image processing algorithms, prior attention modules, convolutional layers, or the like, before being provided as input to the repeated convolution-based attention module embodied by the apparatus 200 or a module thereof. In other embodiments, the attention input data object is received by retrieving the attention input data object from one or more databases. In some such embodiments, the attention input data object may have been previously captured and stored. In some embodiments, the attention input data object is retrieved from a local database associated with the apparatus 200. In other embodiments, the attention input data object is retrieved from a remote system, database, or the like, for example from an image and location management system communicable with the apparatus 200. For example, the apparatus 200 may include means, such as the communications module 208, processor 202, and/or the like, for requesting data, including the attention input data object, from an identified or predetermined image and location management system, and receiving the attention input data object in response.

In some embodiments, the attention input data object may embody a captured representation of an environment associated with one or more sensor(s). For example, in an example where the apparatus 200 embodies a sub-system integrated into or otherwise associated with an autonomous vehicle or semi-autonomous vehicle, the attention input data object represents a captured portion of the environment around the vehicle. For example, the attention input data object may be a camera image captured or otherwise associated with a particular region around the vehicle.

The attention input data object may include various features that, upon identification and/or detection via the attention input data, are particularly important and useful for decision-making, navigation, and control of the autonomous vehicle. For example, the attention input data object may include signposts, traffic signals, other vehicles, pedestrians, buildings, lane markers, crosswalks, roadway images, sidewalks, and/or the like. The attention input data object may also include background imagery and/or pixels not dedicated to features relevant for a particular task, such as pixels representing sky, objects at a significant distance such as mountains, and the like. In this regard, the attention input data object in one example includes some pixels that are highly important towards a particular task (e.g., immediate control of an autonomous or semi-autonomous vehicle), such as cones, pedestrians, objects, lane markers, and the like that should be given attention.

In at least some embodiments, the attention input data object may be received as pixel data representing, or otherwise embodying, the representation of the image. For example, the attention input data object may be received comprising RGB data for each pixel associated with the attention input data object. In other words, the attention input data object may comprise multiple channels that form the attention input data object (e.g., a red channel, a blue channel, and a green channel), representing a depth of the particular attention input data. In other embodiments, the attention input data object may comprise one or more alternative channels, further increasing the dimensionality associated with the attention input data object. In this regard, in some embodiments, the attention input data object is embodied by data having a particular shape of [X, Y, Z], where X is a width, Y is a height, and Z is a depth.

In some embodiments, the attention input data object may represent a feature map. For example, the feature map may be generated by pre-processing a captured or retrieved input via one or more layers of a convolutional neural network. In an example context, an input image, captured via one or more sensor(s) or retrieved from a database, may be input to one or more convolutional layers to produce the feature map. Additionally or alternatively, an input image may be pre-processed by one or more other layers of the convolutional neural network before being provided to the repeated convolution-based attention module.

In some embodiments, the apparatus 200 further includes means, such as attention management module 212, processor 202, and/or the like, or a combination thereof, for applying the attention input data object to a repeated convolution-based attention module. The repeated convolution-based attention module may include, or otherwise be configured to perform, various operations for producing, or otherwise outputting, a particular attention module output based on the received attention input data object.

The repeated convolution-based attention module may include various operations, one or more of which may be repeated a number of times. For example, in some embodiments, the repeated convolution-based attention module may be associated with an attention repetition threshold, such that information is applied to a repeated convolutional application layer for a number of times based on the attention repetition threshold. The repeated convolution-based attention module may produce an attention module output through using one or more convolutional application layers. For example, the repeated convolution-based attention module may include an initial convolutional application layer, which may be embodied by one or more sub-convolutional application layers, and one or more repeated convolutional application layers. The various layers may be embodied in hardware, software, or a combination thereof. In some such embodiments, the repeated convolutional application layers may be embodied by shared hardware, software, or a combination thereof. For example, a single, shared specialized hardware implementation may be used, for example by the apparatus 200, or specific components or modules embodying the repeated convolution-based attention module, to implement multiple iterations of the repeated convolutional application layer. Alternatively, each iteration may be embodied by separate hardware and/or software. In at least one embodiment, for example, the repeated convolution-based attention module may be configured to perform at least blocks 604-614 as described below. The attention input data object may be provided as an initial input parameter.

At optional block 604, the apparatus 200 includes means, such as attention management module 212, processor 202, and/or the like, or a combination thereof, for applying the attention input data object to an initial convolutional application layer. The initial convolutional application layer may produce an initial convolutional output based on the attention input data object. The initial convolutional application layer may be configured and/or trained to pre-process the attention input data object to produce the initial convolutional output. For example, the initial convolutional output may embody the attention input data object transformed for analysis by a repeated convolutional application layer. For example, the initial convolutional output may embody the attention input data object transformed to produce an initial convolutional output of a particular shape and/or having particular values interpretable by the repeated convolutional application layer. Alternatively, in some embodiments, the apparatus 200 may not perform, or may not be configured to perform, the initial convolutional application layer, such that apparatus 200 begins analysis of a received attention input data object directly using various iterations of a repeated convolutional application layer.

The apparatus 200 may include means to maintain an input parameter applied to the repeated convolutional application layer for each iteration. In some embodiments, for example where the apparatus 200 is configured with an initial convolutional application layer, the initial input parameter may be set to the initial convolutional output. Alternatively, in other embodiments, the initial input parameter may be set to the attention input data object.

At block 606, the apparatus 200 includes means, such as attention management module 212, processor 202, and/or the like, or a combination thereof, for applying the input parameter to a repeated convolutional application layer to produce an additional convolutional output. For the first iteration of the repeated convolutional application layer, the input parameter may be embodied by the output of the initial convolutional application layer. The repeated convolutional application layer may produce an additional convolutional output based on the input parameter. The additional convolutional output may represent, or be associated with, one or more attention features learned during training to be important regarding accurately completing a particular task, such that the additional convolutional output emphasizes the particular attention features learned by the current iteration of the repeated convolutional application layer. The additional convolutional output may weigh pixels, or groups of pixels, higher to draw attention to the pixel(s) that correspond to higher level attention features than the attention features represented in the initial convolutional output. For example, the additional convolutional output may weigh particular pixel(s) associated with a particular attention feature determined based on the activations in the initial convolutional output. The repeated convolutional application layer may learn the attention features most useful in mapping the input to the output values. In this regard, it should be appreciated that, in some embodiments, each iteration of the repeated convolutional application layer produces a new additional convolutional output that represents further refined attention data focusing on higher-level attention regions (for example, pixels and/or groups of pixels) identified to be important for a particular task that the attention module (and thereby the repeated convolutional application layer therein) is trained to improve.

In some embodiments, the repeated convolutional application layer may include one or more sub-layers arranged for producing the repeated convolutional output for each iteration. For example, in some embodiments, the repeated convolutional application layer includes a first convolutional application sub-layer and a second convolutional application sub-layer. In this regard, the first convolutional application sub-layer may generate a first sub-output, which is provided as input to the second convolutional application sub-layer, which may then generate the repeated convolutional output based on the first sub-output. It should be appreciated that, in other embodiments, the repeated convolutional application layer may include any number of sub-layers, such that the output of each sub-layer is used by a subsequent sub-layer, until a final sub-layer produces the repeated convolutional output.

Forming a repeated convolutional application layer through one or more sub-layers may provide additional benefits in implementations of repeated convolution-based attention modules (including parallel repeated convolution-based attention modules as described below). For example, each sub-layer may enable the implementation to further add complexity and/or non-linearity to the module. In this regard, such implementations may further improve accuracy and/or efficiency of such implementations.

At block 608, the apparatus 200 includes means, such as attention management module 212, processor 202, and/or the like, or a combination thereof, for augmenting the initial convolutional output, based on the additional convolutional output produced for the current iteration. In some embodiments, the apparatus 200 is configured to augment the initial convolutional output based on the additional convolutional output using an addition transformation. In other embodiments, another transformation may be used, including but not limited to a concatenation transformation. The addition (or other) transformation may augment the initial convolutional output to produce an augmented convolutional output that represents the initial convolutional output emphasized by the attention features identified by the current iteration of the repeated convolutional application layer and represented by the additional convolutional output of the current iteration. The augmented convolutional output may be used for further iterations of the repeated convolutional application layer embodied. In this regard, for example, the apparatus 200 may utilize the augmented convolutional output as the input parameter for a subsequent operation, for example as the input to the next iteration of the repeated convolutional application layer.

In a particular example, the initial convolutional application layer may represent a first kernel for analyzing the attention input data object. The repeated convolutional application layer may represent a second kernel for analyzing the output from the previous iteration of the repeated convolutional application layer. In this regard, the initial convolutional application layer need only be applied once, reducing amount of required computational resources. In some such embodiments, the additional convolutional output produced by the repeated convolutional application layer is then augmented using a transformation, such as an addition transformation, to simulate the operation of the single repeated convolutional application layer, for example depicted and described with respect to FIG. 5.

Blocks 606 and 608 may represent one iteration of the convolution-based attention module, particularly including one iteration of the repeated convolutional application layer and corresponding augmentation. In some embodiments, the repeated convolution-based attention module repeats the operations depicted by these blocks for multiple iterations. For example, in some embodiments, the repeated convolution-based attention module may include, or otherwise repeat, use of at least one hardware and/or software component embodying one or more implementations of the repeated convolutional application layer and augmentation block. In other embodiments, the repeated convolution-based attention module may include hardware and/or software that provides the convolutional output from the current iteration as the input to separate hardware and/or software embodying the next iteration of the repeated convolutional application layer and augmentation block. For example, in some embodiments, the apparatus 200 includes a repeated convolution-based attention module that embodies at least one, or each, iteration of the repeated convolutional application layer and/or augmentation block in separate hardware and/or software from that embodying a previous iteration.

At block 610, the apparatus 200 includes means, such as attention management module 212, processor 202, and/or the like, or a combination thereof, to determine whether to repeat using the repeated convolutional application layer. In some embodiments, apparatus 200 is configured to include customized hardware for multiple iterations of the repeated convolutional application layer. In some embodiments, the apparatus 200 may include multiple iterations of the repeated convolutional application layer embodied in hardware, software, or a combination thereof, for example where such repeated convolutional application layers are arranged in multiple sequentially-arranged hardware components. In other embodiments, the apparatus 200 is configured to track or otherwise maintain a repetition count, in hardware or software, that is increased (or decreased) upon each iteration until the repetition count satisfies an attention repetition threshold. The apparatus may determine whether to repeat using the repeated convolutional application layer based on the repetition count and attention repetition threshold. For example, the apparatus 200 may repeat using the repeated convolutional application layer if the repetition count satisfies the attention repetition threshold (e.g., in an example context, when the repetition count is below the attention repetition threshold). The repeated convolution-based attention module may comprise and/or repeat for any number of repeated convolutional application layers (e.g., 1 layer, 10 layers, 20 layers, or more).

In a circumstance where the apparatus 200 determines to repeat use of the repeated convolutional application layer, flow returns to block 606. In this regard, the apparatus 200 may include means for updating the input parameter to the augmented convolutional output and/or means for applying the updated input parameter to a subsequent repeated convolutional application layer. Through applying the updated input parameter, the apparatus 200 may produce another additional convolutional output associated with the updated iteration of the repeated convolutional application layer. Each newly outputted additional convolutional output may then be augmented by the initial convolutional output. The augmented convolutional output produced at each iteration may be updated based on the attention features represented in the additional convolutional output produced by the current iteration of the repeated convolutional application layer.

Each additional convolutional output may represent, or otherwise be associated with, higher-level attention features than the output generated by the previous iteration. For example, the additional convolutional output may draw attention to a particular pixel and/or one or more pixel groups by weighting the pixel and/or pixel groups higher. The particular attention features emphasized may be higher-level as more iterations of the repeated convolutional neural network are performed. In this regard, the attention features may be built upon the previously identified attention features produced by the previous iteration of the repeated convolutional application layer. As with the initial convolutional application layer, the repeated convolutional application layer may learn the attention features most useful in mapping the input parameter received for this iteration of the repeated convolutional application layer to the output values.

Each repeated convolutional application layer may share parameters. In other words, as the number of iterations using the repeated convolutional application layer increases, the number of parameters does not increase. As such, by leveraging several iterations of the repeated convolutional application layer, the output of each convolutional application layer may build on output of the previous convolutional application layer to more accurately determine higher-level attention features without requiring significant additional memory resources.

In a circumstance where the apparatus 200 determines, for example at block 610, not to repeat use of the repeated convolutional application layer (or in some embodiments, that no further iterations exist, for example in embodiments utilizing a sequentially-arranged hardware configuration), flow continues to block 612. At block 612, the apparatus 200 includes means, such as attention management module 212, processor 202, and/or the like, or a combination thereof, for augmenting the attention input data object, based on the final augmented convolutional output. The attention input data object may be augmented with a transformation to preserve the activations of the attention input data object while including the attention data of the final augmented convolutional output. For example, in some embodiments, the apparatus 200 may be configured for augmenting the attention input data object based on the final augmented convolutional output using a concatenation transformation. In other embodiments, the apparatus 200 may be configured to use another transformation, such as an addition transformation. The concatenated data may embody an attention module output produced by the apparatus 200. Using a concatenation transformation (or another similar transformation or combination of transformations), the produced attention module output preserves the activation signals of the original attention input data object, while emphasizing the attention data (e.g., the identified attention features) represented in the final augmented convolutional output. In some examples, the final augmented convolutional output is the augmented convolutional output produced by the final iteration of the repeated convolutional application layer and subsequent augmentation.

At block 614, the apparatus 200 includes means, such as attention management module 212, input/output module 206, communications module 208, processor 202, and/or the like, or a combination thereof, for outputting the attention module output. The attention module output may comprise the output generated by augmentation of the attention input data object with the final augmented convolutional output for the previous, and final, iteration of the repeated convolutional application layer and subsequent augmentation. In this regard, the outputted or otherwise produced attention module output may include both data associated with the attention input data object (for example, the original input activation signals of an image or feature map), and subsequent attention features represented by the final augmented convolutional output built using various iterations of the repeated convolutional application layer(s) and augmentation block(s).

In some embodiments, the attention module output is outputted for rendering, or otherwise displaying, to a user. For example, the apparatus 200 may transmit signals representing and/or associated with the attention module output to render an interface associated with the attention module output. In some such embodiments, the attention module output may be rendered to the user to enable the user to analyze the attention module output. In some embodiments, the attention module output is outputted to another system, module, or the like.

Alternatively, in some embodiments, the attention module output is produced or otherwise outputted to one or more subsequent processing neural network layers of a neural network within which the repeated convolution-based attention module is integrated. For example, the attention module output may be produced and input into a subsequent convolutional application layer for further processing. In another example context, the attention module output may be produced and input into a subsequent repeated convolution-based attention module for further processing. The attention module output may be processed by the subsequent layer(s) and/or module(s) to improve the accuracy of the analysis of the subsequent layer(s) and/or module(s) based on the attention data included in the attention module output.

For example, in some embodiments, the apparatus 200 is configured for outputting the attention module output to another layer of a neural network model within which the repeated convolution-based attention module is integrated, and/or an associated system, for further processing. At block 616, for example, the apparatus 200 includes means, such as attention management module 212, processor 202, and/or the like, or a combination thereof, for applying the attention module output to a remaining neural network processing layer. In some embodiments, the remaining neural network processing layer embodies another intermediate layer of convolutional neural network within which the repeated convolution-based attention module is integrated. Alternatively, the remaining neural network processing layer may be configured to generate an image classification, or multiple image classifications, associated with the attention input data object based on the attention module output. For example, the remaining neural network processing layer may generate one or more labels associated with various regions of the attention input data object, such as to label features present in the image (e.g., vehicles, objects, lane markers, and the like). In this regard, the remaining neural network processing layer may be configured to determine the classifications, labels, or the like, based at least on the attention data represented by the attention module output. It should be appreciated that the convolutional neural network may be trained for any number of actions, including object detection, image classification, and the like. Additionally or alternatively to including one or more remaining neural network processing layer(s), in some embodiments, the apparatus 200 includes one or more neural network processing layers performed before block 602. For example, in some embodiments, the apparatus 200 is configured to use one or more pre-processing neural network processing layers arranged and/or embodied before use an attention module configured to perform, or otherwise embodying, blocks 602-616.

Parallel Repeated Convolution-Based Attention Modules

Utilizing an initial convolutional application layer to pre-process an attention input data object enables the implementations of a repeated convolution-based attention module to be flexible. Such embodiments may utilize various different architectures to implement a repeated-convolutional attention module that performs processing of the attention input data object to produce an attention module output of a certain shape or that produces attention data formulated through one or many specific repeated convolutional application layers applied in a particular series. In some embodiments, for example, a repeated convolution-based attention module is implemented that processes an attention input data object using at least two repeated convolutional application layers executed in parallel (e.g., a parallel repeated convolution-based attention module). In such embodiments, the attention module output may embody attention data that represents attention features identified through multiple iterations of either repeated convolutional application layer, attention data that represents attention features identified by both convolutional application layer, or attention data that represents attention features identified as a combination of the particular attention features identified by the two (or more) convolutional application layers. It should be appreciated that, in some embodiments, any number of different repeated convolutional application layers may be executed in parallel.

FIG. 7 illustrates an example process for generating attention data, for example represented by an attention module output, using a repeated convolution-based attention module, for example performed via the apparatus 200 or one or more components thereof. The repeated convolution-based attention module described with respect to FIG. 7 executes iterations of two repeated convolutional application layers in parallel. For example, the first repeated convolutional application layer may include two sub-layers (e.g., sub-layer 1 of repeated convolutional application layer 1), and the second repeated convolutional application layer may include no sub-layers (e.g., only a single layer). It should be appreciated that, in other embodiments, the repeated convolutional application layer(s) may each have any number of sub-layers.

By arranging repeated convolutional application layers in parallel, such implementations of repeated convolution-based attention modules may provide further advantages. For example, parallel repeated convolution-based attention modules may be implemented capture further complexity and/or non-linearity not captured by sequential implementations. In this regard, such implementations may further improve overall performance of the repeated convolution-based attention module, for example in terms of commutating resource efficiency and/or accuracy of the generated data for a particular task.

Optional operational blocks again are depicted using broken/dashed lines. It should be appreciated that, in some embodiments, all of the optional blocks may be performed. In other embodiments, none of the optional blocks may be performed. Alternatively, in some embodiments, one or more, but not all, of the optional blocks may be performed. Such optional blocks should not limit the scope or spirit of the disclosure herein.

The process begins at block 602 for receiving an attention input data object, for example by apparatus 200 using the means described above with respect to FIG. 6. At optional block 704, the apparatus 200 includes means, such as attention management module 212, processor 202, and/or the like, or a combination thereof, for applying the attention input data object to an initial convolutional application layer. The initial convolutional application layer may produce an initial convolutional output based on the attention input data object. For example, in some embodiments, the initial convolutional application layer may analyze the attention input data object and produce the initial convolutional output for augmentation by subsequent iterations of one or more repeated convolutional application layers. In some embodiments, the initial convolutional application layer may be configured and/or trained to pre-process the attention input data object to produce the initial convolutional output. For example, the initial convolutional output may embody the attention input data object transformed for analysis by a plurality of repeated convolutional application layers. For example, the initial convolutional output may embody the attention input data object transformed to produce an initial convolutional output of a particular shape and/or having particular values interpretable by a first repeated convolutional application layer and a second repeated convolutional application layer. Alternatively, in some embodiments, the apparatus 200 may not perform, or may not be configured to perform, the initial convolutional application layer, such that apparatus 200 begins analysis of a received attention input data object directly using various iterations of the repeated convolutional application layer(s).

In some embodiments, the apparatus 200 may include means to maintain an input parameter associated with each of the repeated convolutional application layers. For example, the apparatus 200 may maintain a first input parameter for use by iterations of the first repeated convolutional application layer, and a second input parameter for use by iterations of the second convolutional application layer. In some embodiments, for example where the apparatus 200 is configured with an initial convolutional application layer, the first input parameter and second input parameter may be set to the initial convolutional output as an initial input parameter. Alternatively, in other embodiments, the initial input parameters for the first input parameter and second input parameter may each be set to the attention input data object.

In some such embodiments, the apparatus 200 is configured to execute multiple iterations of repeated convolutional application layers in parallel. For example, the apparatus 200 may be configured to execute iterations of a first repeated convolutional application layer and corresponding augmentation (represented by blocks 706A-710A) and execute iterations of a second repeated convolutional application layer and corresponding augmentation (represented by blocks 706B-710B). At block 706A, the apparatus 200 includes means, such as attention management module 212, processor 202, and/or the like, or a combination thereof, for applying the first input parameter to a first repeated convolutional application layer to produce a first additional convolutional output. In some embodiments, the first repeated convolutional application layer comprises one or more sub-layers, for example two-sub layers (e.g., a first sub-layer and a second sub-layer). For the first iteration of the first repeated convolutional application layer, the first input parameter may be embodied by the initial convolutional output produced by the initial convolutional application layer. The first repeated convolutional application layer may produce a first additional convolutional output based on the first input parameter. For example, the first additional convolutional output may embody first attention data identified via processing by the first sub-layer and second sub-layer of the first repeated convolutional application layer.

Similarly, at block 706B, the apparatus 200 includes means, such as attention management module 212, processor 202, and/or the like, or a combination thereof, for applying the second input parameter to a second repeated convolutional application layer to produce a second additional convolutional output. Specifically, in at least some embodiments, the apparatus 200 may include such means to execute block 706A and 706B in parallel. In some such embodiments, the apparatus 200 may leverage specialized processing hardware or functionality to enable such parallel processing, for example by utilizing multiple cores of a processor, multi-sub-processors of a particular processor, multi-threading, hyper-threading, or the like.

For the first iteration of the second repeated convolutional application layer, the second input parameter may be embodied by the initial convolutional output produced by the initial convolutional application layer. The second repeated convolutional application layer may produce a second additional convolutional output based on the second input parameter. The second additional convolutional output may represent, or be associated with, one or more attention features learned during training to be important regarding accurately completing a particular task, such that the second additional convolutional output emphasizes particular attention features learned by the current iteration of the second repeated convolutional application layer. The second additional convolutional output may weigh pixels, or groups of pixels, higher to draw attention to the pixel(s) that correspond to attention features for emphasis. For example, the additional convolutional output may weigh particular pixel (s) associated with a particular attention feature determined based on the activations in the initial convolutional output. The second repeated convolutional application layer may learn, for example through a training stage, to identify the attention features most useful in mapping the input to the output values in conjunction with execution of the iterations of the first repeated convolutional application layer. In this regard, it should be appreciated that, in some embodiments, each iteration of the repeated convolutional application layer produces a new additional convolutional output that represents further refined attention data focusing on attention regions (for example, pixels and/or groups of pixels) identified to be important for a particular task that the attention module, and thereby the first and second repeated convolutional application layers, was trained to improve upon.

In some embodiments, the second repeated convolutional application layer may also include one or more sub-layers arranged for producing the second repeated convolutional output for each iteration. For example, in some embodiments, the second repeated convolutional application layer includes a first sub-layer for the second repeated convolutional application layer and a second sub-layer for the second repeated convolutional application layer. It should be appreciated that, in other embodiments, the repeated convolutional application layer may include any number of sub-layers, such that the output of each sub-layer is used by a subsequent sub-layer, until a final sub-layer produces the second repeated convolutional output.

At block 708A, the apparatus 200 includes means, such as attention management module 212, processor 202, and/or the like, or a combination thereof, for augmenting the initial convolutional output, based on the first additional convolutional output, to produce a first augmented convolutional output. In some embodiments, the initial convolutional output may be augmented based on the first additional convolutional output using an addition transformation. In other embodiments, another transformation, including but not limited to a concatenation transformation, may be used. In yet other embodiments, a combination of transformations may be used to augment the outputs. Additionally, in some such embodiments, the apparatus 200 may be configured, utilizing such means, to update the first input parameter to the newly produced first augmented convolutional output, or in other words, to set the first input parameter to the first augmented convolutional output.

The transformation, for example an addition transformation, may augment the initial convolutional output to produce an augmented convolutional output that represents the initial convolutional output emphasized by the attention features identified by the current iteration of the first repeated convolutional application layer, such as the attention features represented by the attention data embodied by the first additional convolutional output of the current iteration. The first augmented convolutional output may then be used for further iterations of the first repeated convolutional application layer. In this regard, the apparatus 200 may use the first input parameter, newly set to the first augmented convolutional output, for subsequent operations, for example as the input to the next iteration of the first repeated convolutional application layer. It should be appreciated that the first repeated convolutional application layer may represent any kernel for analyzing the attention input data object.

Similarly, at block 708B, the apparatus 200 includes means, such as attention management module 212, processor 202, and/or the like, or a combination thereof, for augmenting the initial convolutional output, based on the second additional convolutional output produced by the current iteration of the second convolutional application layer, to produce a second augmented convolutional output. In some embodiments, the initial convolutional output may be augmented based on the second additional convolutional output using an addition transformation. In other embodiments, another transformation, including but not limited to a concatenation transformation, may be used. In yet other embodiments, a combination of transformations may be used to augment the outputs. Additionally, in some such embodiments, the apparatus 200 may be configured, utilizing such means, to update the second input parameter to the second augmented convolutional output, or in other words, to set the second input parameter to the second augmented convolutional output. It should be appreciated that, in at least some embodiments, the apparatus 200 utilize such means to execute block 708A and 708B in parallel.

The transform, for example an addition transformation, may augment the initial convolutional output to produce the second augmented convolutional output that represents the initial convolutional output emphasized by the attention features identified by the current iteration of the second repeated convolutional application layer, such as the attention features represented by the attention data embodied by the second additional convolutional output of the current iteration. The second augmented convolutional output may then be used for further iterations of the second repeated convolutional application layer. In this regard, the apparatus 200 may use the second input parameter, newly set to the second augmented convolutional output, for subsequent operations, for example as the input to the next iteration of the second repeated convolutional application layer. It should be appreciated that the second convolutional repeated application layer may represent any kernel for analyzing the attention input data object, which differs from the first repeated convolutional application layer. In this regard, the second repeated convolutional application layer and first repeated convolutional application layer may learn to identify different attention features and/or otherwise emphasize different features determined as important towards a particular task.

At block 710A, the apparatus 200 includes means, such as attention management module 212, processor 202, and/or the like, or a combination thereof, to determine whether to repeat using the initial convolutional application layer. In some embodiments, the apparatus 200 includes customized hardware for multiple iterations of the first repeated convolutional application layer. Such embodiments may include sequentially-arranged hardware components for each iteration. In other embodiments, the apparatus 200 is configured, in hardware, software, or a combination thereof, to track or otherwise maintain a first repetition count associated with the iterations of the first repeated convolutional application layer and subsequent augmentation. For example, the first repetition count may be incremented or decremented upon each iteration until the first repetition count satisfies a first attention repetition threshold, which represents a number of iterations of the first repeated convolutional application layer and corresponding augmentation.

In a circumstance where, at block 710A, the apparatus determines to repeat use of the first repeated convolutional application layer, flow returns to block 706A to begin another iteration. The first input parameter, which was updated during the previous iteration, may be newly used as input. In this regard, the newly updated first input parameter may be applied to a subsequent iteration of the first repeated convolutional application layer. Through applying the updated first input parameter, the apparatus 200 may produce another first additional convolutional output for the next iteration. The newly outputted first additional convolutional output may then be used to augment the initial convolutional output, to again produce a new first augmented convolutional output. The first augmented convolutional output produced at each iteration may be updated based on the attention features represented in the first additional convolutional output produced by that iteration of the first repeated convolutional application layer. Thus, with each iteration of the first repeated convolutional application layer, each new first additional convolutional output may represent higher-level attention features than the output generated by the previous iteration of the first repeated convolutional application layer.

Similarly, at block 710B, the apparatus 200 includes means, such as attention management module 212, processor 202, and/or the like, or a combination thereof, to determine whether to repeat using the second repeated convolutional application layer. In some embodiments, the apparatus 200 includes customized hardware for multiple iterations of the second repeated convolutional application layer. Such embodiments may include sequentially-arranged hardware components for each iteration. In other embodiments, the apparatus 200 is configured, in hardware, software, or a combination thereof, to track or otherwise maintain as second repetition count associated with the iterations of the second repeated convolutional application layer and subsequent augmentation. For example, the second repetition count may be incremented or decremented upon each iteration until the second repetition count satisfies a second attention repetition threshold, which represents a number of iterations of the second repeated convolutional application layer and corresponding augmentation. In some embodiments, the second attention repetition threshold equals the first attention repetition threshold, such that the first repeated convolutional application layer and the second repeated convolutional application layer are repeated for the same number of iterations.

In a circumstance where, at block 710B, the apparatus determines to repeat use of the second repeated convolutional application layer, flow returns to block 706B to begin another iteration. The second input parameter, which was updated during the previous iteration (such as at block 708B), may be newly used as input. In this regard, the newly updated second input parameter may be provided as input to (or in other words, applied to) a subsequent second repeated convolutional application layer. Through applying the updated second input parameter, the apparatus 200 may produce another second additional convolutional output for the next iteration. The newly outputted second additional convolutional output may then be used to augment the initial convolutional output, to again produce a new second augmented convolutional output. The second augmented convolutional output produced at each iteration may be updated based on the attention features represented in the second additional convolutional output produced by that iteration of the second repeated convolutional application layer. Thus, with each iteration of the second repeated convolutional application layer, each new second additional convolutional output may represent higher-level attention features than the output generated by the previous iteration of the second convolutional application layer.

In a circumstance where apparatus 200 determines, for example at block 710A, not to repeat use of the first repeated convolutional application layer for another iteration (or, in some embodiments, that no further iterations exist), the apparatus 200 may wait and/or only continue to block 612 upon verifying completion of all iterations of the second repeated convolutional application layer, and/or all other repeated convolutional application layers. Similarly, in a circumstance where apparatus 200 determines, for example at block 710, not to repeat use of the second repeated convolutional application layer for another iteration (or, in some embodiments, that no further iterations exist), the apparatus 200 may wait and/or continue to block 612 only upon verifying completion of all iterations of the first repeated convolutional application layer, and/or all other repeated convolutional application layers. In some embodiments, for example, the apparatus 200 may track a binary flag or other indicator that represents whether iterations of each repeated convolutional application layer are completed, and proceed once identifying that all flags or indicators indicate completion of all iterations for each repeated convolutional application layer. In some embodiments, such a determination may be made entirely via hardware, entirely via software, or via a combination thereof.

While in some embodiments the operations described with respect to 706A-710A and 706B-710B are performed in parallel, it should be appreciated that, in some such embodiments, one or more of the operations described with respect to 706A-710A is performed at a faster (or slower) execution rate than the operations described with respect to blocks 706B-710B. Thus, in some such embodiments, it should be understood that execution in "parallel" refers to the iterations of each of the first repeated convolutional application layer and the second convolutional application layer, or the operations of each iteration, are performed such that flow does not continue to block 712 until all iterations of the first repeated convolutional application layer and all iterations of the second repeated convolutional application layer are completed.

In a circumstance where the apparatus 200 determines that all iterations of each of the repeated convolutional application layers are not to be repeated, and/or all iterations are completed, for example at block 710A and/or 710B, flow continues to block 712. At block 712, the apparatus 200 includes means, such as attention management module 212, processor 202, and/or the like, or a combination thereof, for augmenting the attention input data object, based on the first final augmented convolutional output and the second final augmented convolutional output. In some embodiments, the apparatus 200 is configured to augment the attention input data object based on the first final augmented convolutional output and the second final augmented convolutional output using a concatenation transformation, for example to preserve the activations of the attention input data object and the attention data of the first and second final augmented convolutional output. In other embodiments, one or more other transformations may be used, for example one or more addition transformations. The attention input data object, first final augmented convolutional output, and second final augmented convolutional output may be used to produce an attention module output using the transformation. Using particular activations, such as a concatenation transformation or similar addition transformation(s), the produced attention module output preserves the activation signals of the original attention input data object, while emphasizing the attention data (e.g., the identified attention features) represented by the first final augmented convolutional output and the second final augmented convolutional output. In some examples, the first final augmented convolutional output is the first augmented convolutional output produced by the final iteration of the first repeated convolutional application layer and subsequent augmentation. Similarly, in some examples, the second final augmented convolutional output is the second augmented convolutional output produced by the final iteration of the second repeated convolutional application layer and subsequent augmentation.

The apparatus 200 may use the attention module output for one or more actions after producing the attention module output. For example, the apparatus 200 may include means configured for outputting the attention module output at block 614. Specifically, in some embodiments, the apparatus 200 may be configured for outputting the attention module output as described above with respect to FIG. 6. Additionally or alternatively, in some embodiments, the apparatus 200 may include means configured for applying the attention module output to a remaining neural network processing layer, or at least one remaining neural network processing layer, at block 616. Specifically, in some embodiments, the apparatus 200 may be configured for outputting the attention module output as described above with respect to FIG. 6.

The repeated nature of the repeated convolution-based attention module enables embodiments to utilize several implementations that are readily customizable based on the desired analysis and/or output from the module. In this regard, FIGS. 8-10 depict various block diagrams of various architectures of repeated convolution-based attention modules in accordance with example embodiments of the present disclosure, specifically various parallel repeated convolution-based attention modules. In each of the FIGS. 8-10, the architecture begins with a received attention input data object. Each subsequent component depicted takes as input the results of all lines that are facing inward (e.g., facing towards the component). As a specific example, the initial convolutional application layer 804 depicted in FIG. 8 takes as input only attention input data object 802, as the only arrow facing block 804. Alternatively, block 810B takes as input the output of the initial convolutional application layer at block 804 and the output of the second repeated convolutional application layer at block 806B, as both arrows face block 810B.

It should be appreciated that while each of the FIGS. 8-10 depict a particular combination of particular component blocks, in other embodiments the specific elements may be altered, modified, enhanced, or the like. For example, in some embodiments, the concatenation transformations depicted with respect to particular blocks of the FIGS. 8-10 may be embodied by one or more alternative transformations, such as one or more addition transformations and/or other transformations that preserve activations of the original input similar to a concatenation transformation. Additionally, in some embodiments, one or more addition transformations depicted with respect to particular blocks of the FIGS. 8-10 may be embodied by one or more alternative transformations, such as one or more concatenation transformations and/or other transformations. Thus, the particular blocks depicted are not to limit the scope and spirit of the disclosure herein.

Turning now to FIG. 8, FIG. 8 illustrates a data flow diagram between blocks of a parallel repeated convolution-based attention module, in accordance with example embodiments of the present disclosure. The blocks illustrated with respect to FIG. 8 may be embodied by a specially configured apparatus, for example apparatus 200, comprising software and/or hardware components or modules embodying each of the blocks depicted. The parallel repeated convolution-based attention module depicted utilizes two repeated convolutional application layers. Specifically, the parallel repeated convolution-based attention module utilizes a first repeated convolutional application layer that comprises two sub-layers (e.g., sub-layer 1 and sub-layer 2). The parallel repeated convolution-based attention module further utilizes a second repeated convolutional application layer not including any sub-layers.

As depicted, the apparatus 200 may be configured to provide the attention input data object 802 as input to the initial convolutional application layer 804. The attention input data object 802 may embody a captured image, which may be transmitted directly from one or more sensor(s), pre-processed using one or more transformations, algorithms, neural networks or layers therein, previous attention modules (including but not limited to other repeated convolution-based attention modules), or the like. Alternatively or additionally, the attention input data object 802 may embody a retrieved or generated feature map. For example, in some embodiments, the attention input data object may be a feature map generated through processing performed by the apparatus 200 or an associated system.

The initial convolutional application layer 804 may pre-process the attention input data object to generate an initial convolutional output configured for further processing via iterations of the first repeated convolutional application layer and the second repeated convolutional application layer. For example, the initial convolutional application layer 804 may process each channel of the attention input data object, and produce an initial convolutional output embodying the results of such processing. In some such embodiments, the attention input data object remains unchanged. As such, computing resources are spared by executing the initial convolutional application layer only once, and augmenting the results with the output of each iteration of the repeated convolutional application layers. Additionally or alternatively, the initial convolutional application layer may pre-process the attention input data object to produce an initial convolutional output that is interpretable and/or otherwise configured to be used as input to the first repeated convolutional application layer and the second repeated convolutional application layer, for example having a particular shape.

In the depicted embodiment, the apparatus 200 may execute iterations of the first repeated convolutional application layer in parallel with iterations of the second repeated convolutional application layer. It should be understood that, while the blocks 806A-822A and 806B-822B are described sequentially with respect to one another to improve the understandability of the disclosure, the blocks may be executing at the same time, or overlapping in portions of time, for example via execution by one or more processors, cores, or sub-processors.

The depicted embodiment includes multiple iterations of each repeated convolutional application layer and subsequent augmentation (as depicted, via an addition transformation). For example, as depicted, blocks 806A-810A embody a first iteration of the first repeated convolutional application layer and subsequent addition transformation. Blocks 812A-816A embody a second iteration of the first repeated convolutional application layer and subsequent addition transformation. Blocks 818A-822A embody a third, and as depicted a final, iteration of the first repeated convolutional application layer and subsequent addition transformation. Similarly, blocks 806B and 810B embody a first iteration of the second repeated convolutional application layer and subsequent addition transformation. Blocks 812B and 816B embody a second iteration of the second repeated convolutional application layer and subsequent addition transformation. Blocks 818B and 822B embody a third, and as depicted a final, iteration of the second repeated convolutional application layer and subsequent addition transformation. It should be appreciated that, in other embodiments, a parallel repeated convolution-based attention module may include any number of repeated convolution-based application layers, and/or may include any number of iterations of such repeated convolutional application layer(s).

The apparatus 200 may provide the output of the initial convolutional application layer 804 as input to the sub-layer 1 of the first repeated convolutional application layer at block 806A. The output of sub-layer 1 of the first repeated convolutional application layer produced at block 806A may be provided as input to sub-layer 2 of the first repeated convolutional application layer at block 808A. Sub-layer 2 of the first repeated convolutional application layer, at block 808A, may process the output produced by sub-layer 1 of the first repeated convolutional application layer to produce the first additional convolutional output. The first additional convolutional output may embody attention data representing attention features identified by the first iteration of the first repeated convolutional application layer for emphasis.

The apparatus 200 may provide (1) the first additional convolutional output from sub-layer 2 of the first repeated convolutional application layer at block 808A and (2) the initial convolutional output from the initial convolutional application layer at block 804, as input to the addition transformation at block 810A. The addition transformation may augment the initial convolutional output based on the first additional convolutional output produced from the first iteration of the first repeated convolutional application layer 808A. In this regard, the feature data embodied by the first additional convolutional output produced by the first iteration of the first repeated convolutional application layer may augment the initial convolutional output to produce a first augmented convolutional output for the first iteration. The apparatus 200 may provide the first augmented convolutional output as input to the second iteration.

The apparatus 200 may be configured to perform similar actions for the subsequent iterations of the first repeated convolutional application layer. In this regard, the apparatus 200 may provide the output of the addition transformation at block 810 (e.g., a first augmented convolutional output) as input to the second iteration of sub-layer 1 of the first repeated convolutional attention layer at block 812A. The output produced by the second iteration of sub-layer 1 of the first repeated convolutional attention layer is provided as input to the second iteration of sub-layer 2 of the first repeated convolutional application layer at block 814A. The apparatus 200 may subsequently provide (1) the first additional convolutional output produced by the second iteration of sub-layer 2 of the first repeated convolutional attention layer at block 814A and (2) the initial convolutional output produced by the initial convolutional application layer at block 804, to the addition transform at block 816A. The addition transformation at block 816A may augment the initial convolutional output based on the first additional convolutional output produced by the second iteration of the first repeated convolutional application layer to produce another first augmented convolutional output for the second iteration.

Finally, the apparatus 200 may be configured to perform similar actions for the third and final iteration of the first repeated convolutional application layer. In this regard, the apparatus 200 may provide the output produced by the addition transformation at block 816A (e.g., a first augmented convolutional output for the second iteration) as input to the third iteration of sub-layer 1 of the first repeated convolutional attention layer at block 818A. The output produced by the third iteration of sub-layer 1 of the first repeated convolutional attention layer is provided as input to the third iteration of sub-layer 2 of the first repeated convolutional application layer at block 820A. The apparatus 200 may subsequently provide (1) the first additional convolutional output produced by the third iteration of sub-layer 2 of the first repeated convolutional attention layer at block 820A and (2) the initial convolutional output produced by the initial convolutional application layer at block 804, to the addition transform at block 822A. The addition transformation at block 822A may augment the initial convolutional output based on the first additional convolutional output produced by the third iteration of the first repeated convolutional application layer. For example, the addition transformation at block 822A may produce another first augmented convolutional output for the third iteration.

In parallel with the execution of blocks 806A-822A, the apparatus may process the output of the initial convolutional application layer 804 via the blocks 806B-822B. The apparatus 200 may provide the output from the initial convolutional application layer 804 as input to the first iteration of the second repeated convolutional application layer. The first iteration of the second repeated convolutional application layer may process the initial convolutional output to produce the second additional convolutional output for the first iteration of the second repeated convolutional application layer. The second additional convolutional output for the first iteration may embody attention data representing attention features identified by the first iteration of the second repeated convolutional application layer. Particularly where the first repeated convolutional application layer embodies a different kernel than the second repeated convolutional application layer, the first iteration of the first additional convolutional output and the second additional convolutional output may embody different attention features.

The apparatus 200 may provide (1) the second additional convolutional output from the second repeated convolutional application layer at block 806B and (2) the initial convolutional output from the initial convolutional application layer at block 804, as input to the addition transformation at block 810B. The addition transformation at block 810B may augment the initial convolutional output based on the second additional convolutional output produced from the first iteration of the second repeated convolutional application layer 808B. In this regard, the feature data embodied by the second additional convolutional output produced by the first iteration of the second repeated convolutional application layer may augment the initial convolutional output to produce a second augmented convolutional output for the first iteration. The second augmented convolutional output may be provided as input to the second iteration of the second repeated convolutional application layer.

The apparatus 200 may be configured to perform similar actions for the subsequent iterations of the second repeated convolutional application layer. In this regard, the apparatus 200 may provide the output of the addition transformation at block 810B (e.g., a second augmented convolutional output for the first iteration) as input to the second iteration of the second repeated convolutional attention layer at block 812B. The second convolutional attention layer at block 812B produces a second additional convolutional output for the second iteration. The apparatus 200 may subsequently provide (1) the second additional convolutional output produced by the second iteration of the second repeated convolutional attention layer at block 812B and (2) the initial convolutional output produced by the initial convolutional application layer at block 804, to the addition transform at block 816B. The addition transformation at block 816B may augment the initial convolutional output based on the second additional convolutional output produced by the second iteration of the second repeated convolutional application layer to produce another second augmented convolutional output, specifically a second augmented convolutional output for the second iteration.

The apparatus 200 may be configured to perform similar actions for the third and final iteration of the second repeated convolutional application layer. In this regard, the apparatus 200 may provide the output produced by the addition transformation at block 816B (e.g., a second augmented convolutional output for the second iteration) as input to the third iteration of the second repeated convolutional attention layer at block 818B. The second repeated convolutional attention layer at block 818B produces a second additional convolutional output for the third iteration. The apparatus 200 may subsequently provide (1) the second additional convolutional output produced by the third iteration of the second repeated convolutional attention layer at block 818B and (2) the initial convolutional output produced by the initial convolutional application layer at block 804, as input to the addition transform at block 822B. The addition transformation at block 822B may augment the initial convolutional output based on the second additional convolutional output produced by the third iteration of the second repeated convolutional application layer. For example, the addition transformation at block 822B may produce another second augmented convolutional output for the third iteration.

Upon completion of all iterations of the first and second repeated convolutional application layers, for example after the apparatus 200 produces a first final augmented convolutional output at block 822A and second final augmented convolutional output at block 822B, both final augmented convolutional outputs may be used to augment the original attention input data object. For example, as depicted, the apparatus 200 may provide (1) the initial convolutional output produced at block 804, (2) the first final augmented convolutional output produced by the final iteration of the first repeated convolutional application layer (e.g., at block 822A), and (3) the second final augmented convolutional output produced by the final iteration of the second repeated convolutional application layer (e.g., at block 822B). The concatenation transformation may append the first final augmented convolutional output and the second final augmented convolutional output to the original attention input data object 804. At block 824, the apparatus 200 produces the attention module output 826 embodying the concatenated data. In this regard, the attention module output 826 may comprise, and thus preserve, the original activations of the attention input data object 802, as well as the attention data representing the attention features identified by the multiple iterations of the first repeated convolutional application layer and the multiple iterations of the second repeated convolutional application layer.

Upon producing the attention module output 826, the apparatus 200 may perform one or more actions using the attention module output 826. For example, the apparatus 200 may output the attention module output 826 for rendering. Alternatively or additionally, the apparatus 200 may output the attention module output 826 for further processing, for example by one or more remaining neural network processing layers.

FIG. 9 illustrates a data flow diagram between blocks of another parallel repeated convolution-based attention module, in accordance with example embodiments of the present disclosure. The blocks illustrated with respect to FIG. 9 may be embodied by a specially configured apparatus, for example apparatus 200, comprising software and/or hardware components or modules embodying each of the blocks depicted. The parallel repeated convolution-based attention module depicted utilizes two repeated convolutional application layers, specifically the two repeated convolutional attention layers described with respect to the parallel repeated convolution-based attention module depicted in FIG. 8

The parallel repeated convolution-based attention module may include blocks 802-822A and 802-822B. In this regard, an attention input data object 802 may be received and processed by an initial convolutional application layer 804 to produce an initial convolutional output. The initial convolutional output may be processed using various iterations of the first repeated convolutional application layer and the second repeated convolutional application layer. For example, the first repeated convolutional application layer may be repeatedly used for multiple iterations embodied via blocks 806A-822A. The additional transformation at block 822A produces a first final augmented convolutional output associated with the first repeated convolutional application layer. Similarly, the second repeated convolutional application layer may be repeatedly used for multiple iterations embodied via blocks 806B-822B. The additional transformation at block 822B produces a second final augmented convolutional output associated with the second repeated convolutional application layer.

In the embodiment depicted in FIG. 9, the apparatus 200 provides the first final augmented convolutional output associated with the first repeated convolutional application layer (e.g., produced at block 822A) and the second final augmented convolutional output associated with the second repeated convolutional application layer, to the addition transformation at block 924. The addition transformation may add the first final augmented convolutional output and the second final augmented convolutional output to produce a combined augmented convolutional output. The combined augmented convolutional output may represent the added attention data embodied by each final augmented convolutional output. For example, the combined augmented convolutional output may represent the added activation weights of each pixel, or group of pixels, of each final augmented convolutional output.

The apparatus 200 provides (1) the attention input data object 802 and (2) the combined augmented convolutional output (e.g., produced at block 924) to the concatenation transform at block 926. At block 926, the apparatus 200 produces the attention module output 928 embodying the concatenated data. In this regard, the attention module output 928 may comprise, and preserve, the original activations of the attention input data object 802, as well as the attention data embodied by the combined augmented convolutional output. For example, the attention module output 928 may represent the activations of the attention input data object 802 and the combined activations of the combined augmented convolutional output produced via the addition transformation at block 924.

Upon producing the attention module output 928, the apparatus 200 may perform one or more actions using the attention module output 928. For example, the apparatus 200 may be configured for outputting the attention module output 928 for rendering. Alternatively or additionally, the apparatus 200 may be configured for outputting the attention module output 928 for further processing, for example by one or more remaining neural network processing layers.

FIG. 10 illustrates a data flow diagram between blocks of yet another parallel repeated convolution-based attention module. The blocks illustrated with respect to FIG. 10 may be embodied by a specially configured apparatus, for example the apparatus 200, comprising software and/or hardware components or modules embodying each of the blocks depicted. The parallel repeated convolution-based attention module depicted utilizes two repeated convolutional application layers. Specifically, the parallel repeated convolution-based attention module depicted in FIG. 10 utilizes a first repeated convolutional application layer that comprises two sub-layers (e.g., sub-layer 1 and sub-layer 2). The parallel convolution-based attention module further utilizes a second repeated convolutional application layer not including any sub-layers (e.g., a single layer).

As depicted, the apparatus 200 may be configured to provide the attention input data object 802 as input to the initial convolutional application layer 1004. As described above, the attention input data object 802 may embody a captured image, pre-processed image, feature map, or the like. For example, the attention input data object may be generated, captured, and/or processed by the apparatus 200, or an associated system.

The initial convolutional application layer 1004 may pre-process the attention input data object to generate an initial convolutional output configured for processing via iterations of the first repeated convolutional application layer and the second repeated convolutional application layer as depicted in FIG. 10. For example, the initial convolutional application layer 1004 may process each channel of the attention input data object, and produce an initial convolutional output embodying the results of such processing. In some such embodiments, the attention input data object remains unchanged. As such, computing resources are saved by executing the initial convolutional application layer only once, and augmenting the results with the output of each iteration of the repeated convolutional application layers. Additionally or alternatively, the initial convolutional application layer may pre-process the attention input data object to produce an initial convolutional output that is interpretable and/or otherwise configured to be used as input to the first repeated convolutional application layer and the second repeated convolutional application layer as depicted in FIG. 10, for example the initial convolutional output may be of a certain shape, depth, or the like.

In the depicted embodiment, the apparatus 200 may execute iterations of the first repeated convolutional application layer in parallel with iterations of the second repeated convolutional application layer. As described above, while the blocks 1006A-1020A and 1006A-1018B are described sequentially with respect to one another to improve the understandability of the disclosure, the blocks may be executing at the same time, or overlapping in portions of time, for example via execution by one or more processors, cores, or sub-processors.

The depicted embodiment in FIG. 10 includes multiple iterations of each repeated convolutional application layer and subsequent augmentation (as depicted, via an addition transformation). In the particular embodiment depicted, each iteration of the first and second repeated convolutional application layers leverage the same addition transformation, producing a single augmented convolutional output that is provided as input to the subsequent iteration of both repeated convolutional application layers. For example, as depicted, blocks 1006A, 1008A, and 1010 embody a first iteration of the first repeated convolutional application layer and subsequent addition transformation. Blocks 1012A, 1014A, and 1016 embody a second iteration of the first repeated convolutional application layer and subsequent addition transformation. Blocks 1018A, 1020A, and 1022 embody a third, and as depicted a final, iteration of the first repeated convolutional application layer and subsequent addition transformation. Similarly, blocks 1006B and 1010 embody a first iteration of the second repeated convolutional application layer and subsequent addition transformation. Blocks 1012B and 1016 embody a second iteration of the second repeated convolutional application layer and subsequent addition transformation. Blocks 1018B and 1022 embody a third, and as depicted a final, iteration of the second repeated convolutional application layer and subsequent addition transformation. It should be appreciated that, in other embodiments, a parallel repeated convolution-based attention module may include any number of repeated convolution-based application layers, and/or may include any number of iterations of such repeated convolutional application layer(s). In such embodiments, each repeated convolutional application layer may be augmented using a single addition transformation.

The apparatus 200 may provide the output of the initial convolutional application layer 1004 as input to the sub-layer 1 of the first repeated convolutional application layer at block 1006A. The output of sub-layer 1 of the first repeated convolutional application layer produced at block 1006A may be provided as input to sub-layer 2 of the first repeated convolutional application layer at block 1008A. Sub-layer 2 of the first repeated convolutional application layer, at block 1008A, may process the output produced by sub-layer 1 of the first repeated convolutional application layer to produce the first additional convolutional output. The first additional convolutional output may embody attention data representing attention features identified by the first iteration of the first repeated convolutional application layer for emphasis.

In parallel with execution of blocks 1006A and 1006B, the apparatus 200 may process the output of the initial convolutional application layer 1004 via block 1006B. The apparatus 200 may provide the output from the initial convolutional application layer produced at block 804 as input to the first iteration of the second repeated convolutional application layer at block 1008B. The first iteration of the second repeated convolutional application layer may process the initial convolutional output to produce the second additional convolutional output by the first iteration of the second repeated convolutional application layer. The second additional convolutional output for the first iteration may embody attention data representing attention features identified by the first iteration of the second repeated convolutional application layer. Particularly where the first repeated convolutional application layer embodies a different kernel than the second repeated convolutional application layer, the first additional convolutional output and the second additional convolutional output produced at the first iteration of each repeated convolutional application layer may embody different attention features.

The apparatus 200 may provide (1) the initial convolutional output from the initial convolutional application layer at block 1004, (2) the first additional convolutional output from the first iteration of sub-layer 2 of the first repeated convolutional application layer at block 1008A, and (3) the second additional convolutional output from the first iteration of the second repeated convolutional application layer at block 1006B, to the addition transformation at block 1010. The addition transformation at block 1010 may augment the initial convolutional output based on the first additional convolutional output produced at block 1008A and the second additional convolutional output produced at block 1006B. In this regard, the feature data embodied by the first additional convolutional output produced by the first iteration of the first repeated convolutional application layer and the feature data embodied by the second additional convolutional output produced by the first iteration of the second repeated convolutional application layer may augment the initial convolutional output. For example, the activations embodied in first additional convolutional output and the activations embodied in the second additional convolutional output may be added to the initial convolutional output to produce a combined augmented convolutional output. The combined augmented convolutional output may be provided as input to the second iteration of the first repeated convolutional application layer and the second repeated convolutional application layer.

The apparatus 200 may be configured to perform similar actions for the subsequent iterations of the first repeated convolutional application layer and the second repeated convolutional application layer. In this regard, the apparatus 200 may provide the output of the addition transformation at block 1010 (e.g., the combined augmented convolutional output) as input to the second iteration of the first repeated convolutional application layer, for example to sub-layer 1 of the second iteration at block 1012A, and the second iteration of the second repeated convolutional application layer, for example at block 1012B. From block 1012A, the output of sub-layer 1 of the first repeated convolutional application layer produced at block 1012A may be provided as input to sub-layer 2 of the first repeated convolutional application layer at block 1014A. Sub-layer 2 of the first repeated convolutional application layer, at block 1014A in the second iteration, may process the output produced by the second iteration of sub-layer 1 of the first repeated convolutional application layer to produce another first additional convolutional output. Specifically, the newly produced output at block 1014A may embody first additional convolutional output for the second iteration of the first repeated convolutional application layer. The newly produced first additional convolutional output may embody attention data representing attention features identified by the second iteration of the first repeated convolutional application layer for emphasis.

In parallel with execution of blocks 1012A and 1014A, the apparatus 200 may process the output of the first addition transform at block 1010 via the second iteration of the second repeated convolutional application layer at block 1012B. The apparatus 200 may provide the combined augmented convolution produced at block 1010 as input to the second repeated convolutional application layer at block 1012B. The second repeated convolutional attention layer at block 1012B produces a second additional convolutional output for the second iteration. The second additional convolutional output for the second iteration may embody attention data representing attention features identified by the second iteration of the second repeated convolutional application layer. In some such embodiments, the attention features may represent high-level attention features than the attention features represented by the first iteration of the first repeated convolutional application layer and the first iteration of the second repeated convolutional application layer.

The apparatus 200 provides (1) the initial convolutional output from the initial convolutional application layer at block 1004, (2) the first additional convolutional output from the second iteration of sub-layer 2 of the first repeated convolutional application layer at block 1014A, and (3) the second additional convolutional output from the second iteration of the second repeated convolutional application layer at block 1012B, to the addition transformation at block 1016. The addition transformation at block 1016 may augment the initial convolutional output based on the first additional convolutional output produced at block 1014A and the second additional convolutional output produced at block 1012B. In this regard, the feature data embodied by the first additional convolutional output produced by the second iteration of the first repeated convolutional application layer and the feature data embodied by the second additional convolutional output produced by the second iteration of the second repeated convolutional application layer may augment the initial convolutional output. For example, the activations embodied in the second iteration of the first additional convolutional output and the activations embodied in the second iteration of the second additional convolutional output may be added to the initial convolutional output to produce a combined augmented convolutional output. The combined augmented convolutional output may be provided as input to the third iteration of the first repeated convolutional application layer and the second repeated convolutional application layer, for example for further processing and/or refinement.

As depicted, the apparatus 200 may be configured to perform similar actions for the third, and final, iteration of the first repeated convolutional application layer and the second repeated convolutional application layer. In this regard, the apparatus 200 may provide the output of the addition transformation at block 1016 (e.g., the combined augmented convolutional output for the second iteration) as input to the third iteration of the first repeated convolutional application layer, for example to sub-layer 1 of the second iteration at block 1018A, and the third iteration of the second repeated convolutional application layer, for example at block 1018B. From block 1018A, the output of sub-layer 1 of the first repeated convolutional application layer produced at block 1018A may be provided as input to sub-layer 2 of the first repeated convolutional application layer at block 1020A. Sub-layer 2 of the first repeated convolutional application layer, at block 1020A in the third iteration, may process the output produced by the third iteration of sub-layer 1 of the first repeated convolutional application layer to produce another first additional convolutional output. Specifically, the newly produced output at block 1018A may embody an updated first additional convolutional output for the third iteration of the first repeated convolutional application layer. The newly produced first additional convolutional output may embody attention data representing attention features identified by the third iteration of the first repeated convolutional application layer for emphasis.

In parallel with execution of blocks 1018A and 1020A, the apparatus 200 may process the output of the second addition transform at block 1016 via the third iteration of the second repeated convolutional application layer at block 1018B. The apparatus 200 may provide the combined augmented convolution produced at block 1016 as input to the second repeated convolutional application layer at block 1018B. The second repeated convolutional attention layer at block 1018B produces a second additional convolutional output for the third iteration. The second additional convolutional output for the third iteration may embody attention data representing attention features identified by the third iteration of the second repeated convolutional application layer. In some such embodiments, the attention features may represent high-level attention features than the attention features represented by the first and/or second iteration of the first repeated convolutional application layer and the first and/or iteration of the second repeated convolutional application layer.

The apparatus 200 provides (1) the initial convolutional output from the initial convolutional application layer at block 1004, (2) the first additional convolutional output from the third iteration of sub-layer 2 of the first repeated convolutional application layer at block 1020A, and (3) the second additional convolutional output from the third iteration of the second repeated convolutional application layer at block 1018B, to the addition transformation at block 1022. The addition transformation at block 1022 may augment the initial convolutional output based on the first additional convolutional output produced at block 1020A and the second additional convolutional output produced at block 1018B. In this regard, the feature data embodied by the first additional convolutional output produced by the third iteration of the first repeated convolutional application layer and the feature data embodied by the second additional convolutional output produced by the third iteration of the second repeated convolutional application layer may augment the initial convolutional output. For example, the activations embodied in the third iteration of the first additional convolutional output and the activations embodied in the third iteration of the second additional convolutional output may be added to the initial convolutional output to produce a third and final combined augmented convolutional output for the third iteration.

Upon completion of the final augmentation, for example the final addition transformation at block 1022, the apparatus 200 produces a final combined augmented convolutional output. The final combined augmented convolutional output embodies the initial convolutional output augmented, for example emphasized via the addition transformation, by attention data that represents the attention features identified in the first final additional convolutional output and the second final additional convolutional output. The apparatus 200 may provide (1) the original attention input data object represented by block 802, and (2) the final combined augmented convolutional output produced at block 1022, as input to the concatenation transformation at block 1024. The concatenation transformation may append the final combined augmented convolutional output to the attention input data object 802. At block 1024, the apparatus 200 produces the attention module output 1026 embodying the concatenated data. In this regard, the attention module output 1026 may comprise, and preserve, the original activations of the attention input data object 802 as well as the attention data of the final combined augmented convolutional output.

Upon producing the attention module output 1026, the apparatus 200 may perform one or more actions using the attention module output 1026. For example, the apparatus 200 may output the attention module output 1026 for rendering. Alternatively or additionally, the apparatus 200 may output the attention module output 1-26 for further processing, for example by one or more remaining neural network processing layers.

CONCLUSION

FIGS. 5, 6, and 7 illustrate flowcharts depicting methods according to example embodiments of the present disclosure. FIGS. 8, 9, and 10 illustrate data flows, for example of components in an apparatus or operational blocks in a method, according to example embodiments of the present disclosure. It will be understood that each block of the flowcharts or data flows, and combination of blocks in the flowcharts or data flows, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart or data flow blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart or data flow blocks.

Accordingly, blocks of the flowcharts and/or data flows support combinations of means for performing the specified functions and combinations of operations for performing the specified functions for performing the specified functions. It will also be understood that one or more blocks of the flowcharts and/or data flows, and combinations of blocks in the flowcharts and/or data flows, can be implemented by special purpose hardware-based computer systems which perform the specified functions, or combinations of special purpose hardware and computer instructions.

In some embodiments, some of the operations described above with respect to the flow charts and/or data flows may be modified or further amplified. Furthermore, in some embodiments, additional optional operations may be included. Modifications, amplifications, or additions to the operations above may be performed in any combination.

Having the benefit of the teachings presented in the foregoing description and the associated drawings, many modifications and other embodiments of the disclosure set forth herein will come to mind to one skilled in the art to which this disclosure pertains. Therefore, it is to be understood that embodiments of the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only, and not for purposes of limitation.

What is claimed is:

1. An apparatus for improved neural network implementations using a repeated convolution-based attention module, the apparatus comprising at least one processor and at least one memory having computer coded instructions therein, the computer coded instructions configured to, upon execution by the at least one processor, configure the apparatus to:
receive an attention input data object;
for a plurality of iterations:
generate, for a current iteration, an updated input parameter based at least in part on augmentation of a current input parameter with a previous iteration convolutional output that represents further emphasis of at least one attention feature from the previous iteration convolutional output; and
apply, for the current iteration, the updated input parameter to a repeated convolutional application layer to produce a current iteration convolutional output,
wherein the current iteration convolutional output is utilized as the previous iteration convolutional output for an iteration subsequent to the current iteration,
wherein the updated input parameter is utilized as the current input parameter for the iteration subsequent to the current iteration,
wherein the attention input data object is utilized as the current input parameter for a first iteration of the plurality of iterations;
determine to cease repeating iterations;
augment a final input parameter representing the updated input parameter for a final iteration of the plurality of iterations based at least in part on a final convolutional output representing the current iteration convolutional output for the final iteration of the plurality of iterations to produce an attention module output; and
output the attention module output.

2. The apparatus of claim 1, the apparatus further configured to track a repetition count as each iteration of the plurality of iterations is performed, and wherein to determine to cease repeating, the apparatus is configured to determine that the repetition count reached an attention repetition threshold.

3. The apparatus of claim 1, wherein to generate the updated input parameter at each iteration of the plurality of iterations, the apparatus is configured to concatenate the previous iteration convolutional output to the current input parameter.

4. The apparatus of claim 1, the apparatus is further configured to:
apply the attention module output to a remaining neural network processing layer to produce a convolutional network output based on the attention module output; and
output the convolutional network output.

5. The apparatus of claim 1, wherein the attention input data object comprises one or more of (1) image data, and (2) feature map data.

6. The apparatus of claim 1, wherein the attention module output comprises multidimensional feature map data.

7. The apparatus of claim 1, further comprising an image capture device configured to capture the attention input data object.

8. The apparatus of claim 1, wherein the current input parameter comprises a particular shape, and wherein the repeated convolutional application layer produces the current iteration convolutional output of the first shape.

9. The apparatus of claim 1, wherein the repeated convolutional application layer comprises a kernel that matches a shape and a concatenated depth of the current input parameter.

10. The apparatus of claim 1, wherein each current iteration convolutional output defines updated pixel weights associated with the at least one attention feature.

11. A method for improved neural network implementations using a repeated convolution-based attention module, the method comprising:
receiving an attention input data object;
for a plurality of iterations:
generating, for a current iteration, an updated input parameter based at least in part on augmentation of a current input parameter with a previous iteration convolutional output that represents further emphasis of at least one attention feature from the previous iteration convolutional output; and
applying, for the current iteration, the updated input parameter to a repeated convolutional application layer to produce a current iteration convolutional output,
wherein the current iteration convolutional output is utilized as the previous iteration convolutional output for an iteration subsequent to the current iteration,
wherein the updated input parameter is utilized as the current input parameter for the iteration subsequent to the current iteration,
wherein the attention input data object is utilized as the current input parameter for a first iteration of the plurality of iterations,
determining to cease repeating iterations;
augmenting a final input parameter representing the updated input parameter for a final iteration of the plurality of iterations based at least in part on a final convolutional output representing the current iteration convolutional output for the final iteration of the plurality of iterations to produce an attention module output; and
outputting the attention module output.

12. The method of claim 11, the method further comprising tracking a repetition count as each iteration of the plurality of iterations is performed, and wherein determining to cease repeating comprises determining that the repetition count reached an attention repetition threshold.

13. The method of claim 11, wherein generating the updated input parameter at each iteration of the plurality of iterations comprises concatenating the previous iteration convolutional output to the current input parameter.

14. The method of claim 11, the method further comprising:
applying the attention module output to a remaining neural network processing layer to produce a convolutional network output based on the attention module output; and
outputting the convolutional network output.

15. A computer program product for improved neural network implementations using a repeated convolution-based attention module, the computer program product comprising at least one non-transitory computer-readable storage medium having computer-executable program code instructions stored therein, the computer-executable program code instructions comprising program code instructions to:
receive an attention input data object;
for a plurality of iterations:
generate, for a current iteration, an updated input parameter based at least in part on augmentation of a current input parameter with a previous iteration convolutional output that represents further emphasis of at least one attention feature from the previous iteration convolutional output; and
apply, for the current iteration, the updated input parameter to a repeated convolutional application layer to produce a current iteration convolutional output,
wherein the current iteration convolutional output is utilized as the previous iteration convolutional output for an iteration subsequent to the current iteration,
wherein the updated input parameter is utilized as the current input parameter for the iteration subsequent to the current iteration,
wherein the attention input data object is utilized as the current input parameter for a first iteration of the plurality of iterations;
determine to cease repeating iterations;
augment a final input parameter representing the updated input parameter for a final iteration of the plurality of iterations based at least in part on a final convolutional output representing the current iteration convolutional output for the final iteration of the plurality iterations to produce an attention module output; and
output the attention module output.

16. The computer program product of claim 15, wherein the program code instructions to generate the updated input parameter at each iteration of the plurality of iterations comprise program code instructions to add the previous iteration convolutional output to the current input parameter utilizing an addition transformation.

17. The computer program product of claim 15, wherein the program code instructions to generate the updated input parameter at each iteration of the plurality of iterations include computer program code instructions to concatenate the previous iteration convolutional output to the current input parameter.

18. The computer program product of claim 15, further comprising program code instructions to:
apply the attention module output to a remaining neural network processing layer to produce a convolutional network output based on the attention module output; and
output the convolutional network output.

19. The computer program product of claim 15, further comprising computer program instructions to, in parallel with the plurality of iterations:
apply a second input parameter to a second repeated convolutional application layer to produce a second additional convolutional output, wherein the second input parameter for the first iteration is set to the initial convolutional output;
augment the initial convolutional output, based on the second additional convolutional output, to produce a second augmented convolutional output, where the second input parameter is updated to the second augmented convolutional output; and
repeat at least one iteration to apply the updated second input parameter to the second repeated convolutional application layer to produce the second additional convolutional output for each iteration, and augment the second initial convolutional output based on the second additional convolutional output for each iteration to produce the second augmented convolutional output for each iteration,
wherein to produce the attention module output, the apparatus is configured to augment the attention input data object based on a first final augmented convolutional output and a second final augmented convolutional output.

20. The computer program product of claim 19, wherein the program code instructions to augment the attention input data object based on the first final augmented convolutional output and the second final augmented convolutional output, comprise program code instructions to:
augment the first final augmented convolutional output based on the second final augmented convolutional output, using an addition transformation, to produce a combined convolutional output: and
augment the attention input data object based on the combined convolutional output using a concatenation transformation to produce the attention module output.

* * * * *